(12) United States Patent
Nogami et al.

(10) Patent No.: US 7,764,647 B2
(45) Date of Patent: Jul. 27, 2010

(54) COMMUNICATIONS SYSTEM, AND BASE STATION AND TERMINALS USED THEREIN

(75) Inventors: Toshizo Nogami, Chiba (JP); Takashi Onodera, Yotsukaido (JP)

(73) Assignee: Sharp Kabushiki Kaisha, Osaka (JP)

( * ) Notice: Subject to any disclaimer, the term of this patent is extended or adjusted under 35 U.S.C. 154(b) by 224 days.

(21) Appl. No.: 12/158,007

(22) PCT Filed: Dec. 19, 2006

(86) PCT No.: PCT/JP2006/325291

§ 371 (c)(1),
(2), (4) Date: Jun. 18, 2008

(87) PCT Pub. No.: WO2007/072828

PCT Pub. Date: Jun. 28, 2007

(65) Prior Publication Data

US 2009/0279445 A1    Nov. 12, 2009

(30) Foreign Application Priority Data

Dec. 20, 2005  (JP)  ............................. 2005-366932

(51) Int. Cl.
  *H04W 4/00* (2009.01)
(52) U.S. Cl. .................................... 370/329
(58) Field of Classification Search ............... None
  See application file for complete search history.

(56) References Cited

U.S. PATENT DOCUMENTS 7,545,732 B2 * 6/2009 Oh et al. ..................... 370/206

(Continued)

FOREIGN PATENT DOCUMENTS

JP  2001-238269 A  8/2001

(Continued)

OTHER PUBLICATIONS

"Comments on frequency scheduling and joint power and rate optimization for OFDM," 3GPP TSG-WG1#29, Lucent Technologies, 2002, pp. 1-4.

(Continued)

*Primary Examiner*—Frank Duong
(74) *Attorney, Agent, or Firm*—Birch Stewart Kolasch & Birch LLP

(57) ABSTRACT

A communications system of the present invention is an OFDMA system (100) including a base station (10) and mobile stations (20), the base station (10) communicating wirelessly with the mobile stations (20) over a plurality of channels. Each mobile station (20) includes: a reception quality measuring section (19) for measuring reception quality; and a reception quality information determining section (12) for generating reception quality information only for each subgroup that belongs to the group(s) allocated to that mobile station (20) to report, (i) by 2-step grouping scheme information by which the channels are divided into subgroups, the subgroups are divided into groups, and the groups are allocated to the mobile stations (20) and (ii) according to the reception quality measured by the reception quality measuring section (19). The base station (10) schedules wireless communications over the channels according to the reported reception quality information. Accordingly, the amount of the reception quality information sent from the terminals to the base station is reduced to improve throughput.

17 Claims, 12 Drawing Sheets

U.S. PATENT DOCUMENTS

| | | |
|---|---|---|
| 2001/0024427 A1 | 9/2001 | Suzuki |
| 2004/0203476 A1 | 10/2004 | Liu |
| 2005/0128993 A1* | 6/2005 | Yu et al. .................... 370/342 |
| 2005/0201476 A1* | 9/2005 | Kim et al. .................. 375/260 |
| 2005/0232156 A1* | 10/2005 | Kim et al. .................. 370/236 |
| 2009/0147869 A1* | 6/2009 | Duan et al. ................. 375/260 |

FOREIGN PATENT DOCUMENTS

| | | |
|---|---|---|
| JP | 2003-169036 A | 6/2003 |
| JP | 2004-135305 A | 4/2004 |
| JP | 2005-160079 A | 6/2005 |

OTHER PUBLICATIONS

"Physical Channels and Multiplexing in Evolved UTRA Downlink," 3GPP TSG RAN WG1 Ad Hoc on LTE, NTT DoCoMo, 2005, pp. 1-24.

* cited by examiner

FIG. 5

| Group No. | Mobile Stations Belonging to the Group | Sub-groups Feeding Back CQIs |
|---|---|---|
| Group 1 | UE1<br>UE5<br>UE9 | Sub-group 1<br>Sub-group 4<br>Sub-group 7 |
| Group 2 | UE2<br>UE3<br>UE7 | Sub-group 2<br>Sub-group 5<br>Sub-group 8 |
| Group 3 | UE4<br>UE6<br>UE8 | Sub-group 3<br>Sub-group 6<br>Sub-group 9 |

FIG. 7 (a)

| Channel 1 | Sub-group 1 | |
|---|---|---|
| Channel 2 | Sub-group 2 | Group 1 |
| Channel 3 | Sub-group 3 | |
| Channel 4 | Sub-group 4 | |
| Channel 5 | Sub-group 5 | |
| Channel 6 | Sub-group 6 | Group 2 |
| Channel 7 | Sub-group 7 | |
| Channel 8 | Sub-group 8 | |
| Channel 9 | Sub-group 9 | |
| Channel 10 | Sub-group 10 | Group 3 |
| Channel 11 | Sub-group 11 | |
| Channel 12 | Sub-group 12 | |
| Channel 13 | Sub-group 13 | |
| Channel 14 | Sub-group 14 | Group 4 |
| Channel 15 | Sub-group 15 | |
| Channel 16 | Sub-group 16 | |

FIG. 7 (b)

| Channel 1 | Sub-group 1 | |
|---|---|---|
| Channel 2 | | |
| Channel 3 | Sub-group 2 | |
| Channel 4 | | Group 1 |
| Channel 5 | Sub-group 3 | |
| Channel 6 | | |
| Channel 7 | Sub-group 4 | |
| Channel 8 | | |
| Channel 9 | Sub-group 5 | |
| Channel 10 | | |
| Channel 11 | Sub-group 6 | |
| Channel 12 | | Group 2 |
| Channel 13 | Sub-group 7 | |
| Channel 14 | | |
| Channel 15 | Sub-group 8 | |
| Channel 16 | | |

FIG. 7 (c)

| Channel 1 | Sub-group 1 | |
|---|---|---|
| Channel 2 | | |
| Channel 3 | | |
| Channel 4 | | |
| Channel 5 | Sub-group 2 | |
| Channel 6 | | |
| Channel 7 | | |
| Channel 8 | | Group 1 |
| Channel 9 | Sub-group 3 | |
| Channel 10 | | |
| Channel 11 | | |
| Channel 12 | | |
| Channel 13 | Sub-group 4 | |
| Channel 14 | | |
| Channel 15 | | |
| Channel 16 | | |

FIG. 10 (a)

| Channel 1 | Sub-group 1 | Group 1 |
| Channel 2 | | |
| Channel 3 | Sub-group 2 | Group 2 |
| Channel 4 | | |
| Channel 5 | Sub-group 3 | Group 1 |
| Channel 6 | | |
| Channel 7 | Sub-group 4 | Group 2 |
| Channel 8 | | |
| Channel 9 | Sub-group 5 | Group 1 |
| Channel 10 | | |
| Channel 11 | Sub-group 6 | Group 2 |
| Channel 12 | | |
| Channel 13 | Sub-group 7 | Group 1 |
| Channel 14 | | |
| Channel 15 | Sub-group 8 | Group 2 |
| Channel 16 | | |

FIG. 10 (b)

| Channel 1 | Sub-group 1 | Group 1 |
| Channel 2 | Sub-group 2 | |
| Channel 3 | Sub-group 3 | Group 2 |
| Channel 4 | Sub-group 4 | |
| Channel 5 | Sub-group 5 | Group 3 |
| Channel 6 | Sub-group 6 | |
| Channel 7 | Sub-group 7 | Group 4 |
| Channel 8 | Sub-group 8 | |
| Channel 9 | Sub-group 1 | Group 1 |
| Channel 10 | Sub-group 2 | |
| Channel 11 | Sub-group 3 | Group 2 |
| Channel 12 | Sub-group 4 | |
| Channel 13 | Sub-group 5 | Group 3 |
| Channel 14 | Sub-group 6 | |
| Channel 15 | Sub-group 7 | Group 4 |
| Channel 16 | Sub-group 8 | |

FIG. 11

| Channel 1 | Sub-group 1 | Group 1 |
| Channel 2 | | |
| Channel 3 | | |
| Channel 4 | | |
| Channel 5 | Sub-group 2 | Group 2 |
| Channel 6 | | |
| Channel 7 | Sub-group 3 | |
| Channel 8 | | |
| Channel 9 | Sub-group 4 | Group 3 |
| Channel 10 | Sub-group 5 | |
| Channel 11 | Sub-group 6 | |
| Channel 12 | Sub-group 7 | |
| Channel 13 | Sub-group 8 | |
| Channel 14 | Sub-group 9 | |
| Channel 15 | Sub-group 10 | |
| Channel 16 | Sub-group 11 | |

FIG. 12 (a)

| Group No. | Mobile Stations Belonging to the Group | Sub-groups Feeding Back CQIs |
| --- | --- | --- |
| Group 1 | UE1 (High Priority)<br>UE4 (Low Priority) | Sub-group 1<br>Sub-group 2<br>Sub-group 3 |
| Group 2 | UE2 (High Priority)<br>UE5 (Low Priority) | Sub-group 4<br>Sub-group 5<br>Sub-group 6 |
| Group 3 | UE3 (High Priority)<br>UE6 (Low Priority) | Sub-group 7<br>Sub-group 8<br>Sub-group 9 |

FIG. 12 (b)

| Group No. | Mobile Stations Belonging to the Group | Sub-groups Feeding Back CQIs |
| --- | --- | --- |
| Group 1 | UE4 (Low Priority)<br>UE5 (Low Priority)<br>UE6 (Low Priority) | Sub-group 1<br>Sub-group 2<br>Sub-group 3 |
| Group 2 | UE1 (High Priority)<br>UE2 (High Priority)<br>UE3 (High Priority) | Sub-group 4<br>Sub-group 5<br>Sub-group 6 |
| Group 3 | UE1 (High Priority)<br>UE2 (High Priority)<br>UE3 (High Priority) | Sub-group 7<br>Sub-group 8<br>Sub-group 9 |

US 7,764,647 B2

COMMUNICATIONS SYSTEM, AND BASE STATION AND TERMINALS USED THEREIN

TECHNICAL FIELD

The present invention relates to a communications system including a base station and terminals. The base station communicate with the terminals over a plurality of channels. Each terminal reports reception quality information to the base station. The base station then schedules communications to be performed over the channels on the basis of the reception quality information reported by the terminals. The invention relates also to the base station and terminals used in the communications system.

BACKGROUND ART

A variety of high bandwidth-efficiency technologies are being proposed in mobile communications systems in response to growing data communications demand. One of potentially high bandwidth-efficiency technologies is OFDMA (Orthogonal Frequency Division Multiple Access). OFDMA divides a communication area (cell area) into a plurality of cells and performs communications using the same frequencies across all the cells. The technology modulates data by OFDM and employs TDMA (Time Division Multiple Access), FDMA (Frequency Division Multiple Access), or similar multiple access as its access scheme. OFDMA of course, in an isolated cell, shares a common wireless interface with the cell area, but is capable of achieving high-speed data communications.

A scheduling method for OFDMA systems is being proposed. In HSDPA (High Speed Downlink Packet Access) in W-CDMA (Wideband-Code Division Multiple Access) mobile communications system, communication terminals send the base station a CQI (Channel Quality Indicator; information on downlink condition for all subcarriers). The base station schedules packets on the basis of the CQIs reported for all subcarriers by the communication terminals. See non-patent document 1.

Patent document 1 discloses a method whereby the amount of uplink control information is reduced by organizing subcarriers into blocks and transmitting modulation information for each block (subcarrier number at a particular position in each block and modulation scheme designation information) from mobile stations to the base station. Furthermore, patent document 1 also ponders organizing subcarriers into blocks and according to changes in the environment of transmission paths, adaptively varying the number of subcarriers contained in a block. This method organizes adjacent subcarriers with a less-than-a-predetermined-threshold difference in reception power into blocks and controlling the number of blocks to a minimum, in order to lower the amount of uplink control information.

Non-patent document 2 proposes two methods. A first method organizes subcarriers into groups. All mobile stations calculate average reception quality for the subcarriers in each of the groups and feed back the average reception quality for each of the groups to the base station. A second method organizes subcarriers into groups. Each mobile station is assigned one group in advance and feeds back reception quality only for all the subcarriers in that group to the base station.

Patent Document 1: Japanese Unexamined Patent Publication (Tokukai) No. 2003-169036 (published Jun. 13, 2003)

Non-patent Document 1: Lucent Technologies, "Comments on frequency scheduling and joint power and rate optimization for OFDM," 3GPP, TSG RAN WG1 Meeting #29, R1-02-1321, November 2002

Non-patent Document 2: NTT Docomo, "Physical Channels and Multiplexing in Evolved UTRA Downlink," 3GPP, TSG RAN WG1 Ad Hoc on LTE R1-050590, June 2005

However, in scheduling data transmission in a system where each frequency channel (subcarrier) is allocated to a different mobile station as in the OFDMA system of non-patent document 1, reception quality for all mobile stations and over all frequency channels needs to be compared at a cycle at which the base station changes the allocation. Stated another way, all mobile stations have to periodically inform the base station of reception quality measurements for all frequency channels. That undesirably adds to the amount of uplink control information and overhead.

In addition, in the method of patent document 1, the size of blocks needs to be controlled according to the reception power of incoming subcarriers, and the mobile station needs to notify the base station of a subcarrier number at a particular position, when the subcarriers are organized into blocks. Also, simply organizing adjacent subcarriers with a less-than-a-predetermined-threshold difference in reception power into blocks as in patent document 1 could not sufficiently reduce the amount of information uploaded from the mobile stations to the base station. That might add to overhead.

Simple grouping as in non-patent document 2 could not sufficiently reduce the amount of information uploaded from the mobile stations to the base station. That might add to overhead.

DISCLOSURE OF INVENTION

The present invention, conceived in view of these problems, has an objective of providing a communications system capable of efficient channel grouping for a reduced amount of reception quality information (CQI) that is transmitted from terminals to a base station and hence for better throughput and also of providing a base station and terminals used in the system.

A communications system of the present invention is, to address the problems, characterized in that the system includes a base station and a plurality of terminals, the base station communicating wirelessly with the terminals over a plurality of channels, the terminals each reporting reception quality information for a reception signal to the base station, the base station scheduling communications over the channels according to the reception quality information reported by the terminals, the terminals each including: a reception quality measuring section for measuring reception quality of reception signals for the channels; and a reception quality information determining section for generating, for reporting to the base station, representative reception quality information for each subgroup (i) by a 2-step grouping scheme by which the channels are divided into subgroups and the subgroups are divided into groups and (ii) according to the reception quality measured by the reception quality measuring section, wherein: the groups are allocated to the terminals by the 2-step grouping scheme; and the reception quality information determining section in each terminal generates, for reporting, the representative reception quality information only for each subgroup that belongs to the group(s) allocated to that terminal.

In the configuration, each terminal generates, for reporting, the representative reception quality information only for each subgroup that belongs to the group(s) allocated to the terminal. The configuration can thus reduce the amount of the reception quality information reported to the base station when compared to cases where the terminal reports the reception quality information for all the channels to the base station and where adjacent channels are arranged to form a group and the terminal reports the reception quality information for each of such groups to the base station. As a result, uplink overhead is lowered, and throughput is improved.

The communications system of the present invention may be configured so that the base station includes: a grouping scheme selecting section for selecting a 2-step grouping scheme for use by the reception quality information determining section from a plurality of 2-step grouping schemes; and a transmission section for transmitting information on the 2-step grouping scheme selected by the grouping scheme selecting section to the terminals and that the terminals each includes: a reception section for receiving the information on the 2-step grouping scheme transmitted from the transmission section.

In the configuration, the base station can collectively, hence efficiently, select a 2-step grouping scheme for the terminals.

The communications system of the present invention may be configured so that the terminals each includes: a grouping scheme selecting section for selecting a 2-step grouping scheme for use by the reception quality information determining section from a plurality of 2-step grouping schemes; and a transmission section for transmitting information on the 2-step grouping scheme selected by the grouping scheme selecting section to the base station and that the base station includes: a reception section for receiving the information on the 2-step grouping scheme transmitted from the transmission section.

In the configuration, each terminal selects 2-step grouping scheme information. The base station does not need to be provided with a separate means to select a 2-step grouping scheme.

The grouping scheme selecting section may be configured to select a 2-step grouping scheme for use by the reception quality information determining section from a plurality of 2-step grouping schemes which designate different numbers of groups and which designate equal numbers of subgroups per group.

In the configuration, switching between 2-step grouping schemes does not change the number of subgroups per group. The amount of the reception quality information reported by the terminals to the base station is thus made constant. Therefore, the reception quality information reported by the terminals to the base station can be reduced not to exceed a particular amount. This is especially effective in mobile phone systems to which the present invention may be applied because the systems allow for limited amounts of control information.

Furthermore, in the configuration, when the terminals transmit information on a grouping scheme to the base station so that the base station can recognize the number of groups and the number of channels per subgroup from the transmitted information, the terminals can restrict the amount of the information on a grouping scheme transmitted to the base station. When the number of subcarriers per group is changeable, to enable the base station to recognize the number of groups and the number of channels per subgroup, the terminals need to send, to the base station, information by which to recognize the number of groups and information by which to recognize the number of channels per subgroup. In contrast, the configuration fixes the number of subgroups per group. Therefore, once the terminals send, to the base station, only information by which to recognize the number of groups, the base station can recognize both the number of groups and the number of channels per subgroup.

Furthermore, the configuration fixes the number of subgroups per group. Therefore, the amount of the reception quality information for each group is constant.

In addition, in the configuration, once the number of groups is determined, the number of channels per subgroup is automatically determined. Therefore, the number of channels per subgroup can be changed by switching between 2-step grouping schemes which designate different numbers of groups. Accordingly, the number of channels per subgroup can be reduced, and the dispersion of reception quality at the terminal among the channels in each subgroup can be lowered, by switching between 2-step grouping schemes which designate different numbers of groups. That prevents the precision of the reception quality information from decreasing, thereby optimizing the scheduling that is carried out based on the reception quality information. In other words, the configuration can reduce the amount of the reception quality information reported by the terminals to the base station, while optimizing the scheduling.

The grouping scheme selecting section may be configured to select a 2-step grouping scheme for use by the reception quality information determining section from a plurality of 2-step grouping schemes which designate different numbers of channels per subgroup according to dispersion of reception quality at the terminal among the channels in each subgroup.

In the configuration, the grouping scheme selecting section selects a 2-step grouping scheme for use by the reception quality information determining section from a plurality of 2-step grouping schemes which designate different numbers of channels per subgroup according to dispersion of reception quality at the terminal among the channels in each subgroup. Accordingly, if the dispersion of reception quality at the terminal among the channels in each subgroup increases, the dispersion of reception quality at the terminal can be lowered by reducing the number of channels per subgroup. That prevents the precision of the reception quality information from decreasing, thereby optimizing the scheduling that is carried out based on the reception quality information. In other words, the configuration can reduce the amount of the reception quality information reported by the terminals to the base station, while optimizing the scheduling.

The grouping scheme selecting section may be configured to select a 2-step grouping scheme for use by the reception quality information determining section from a plurality of 2-step grouping schemes which designate different numbers of terminals to which the individual groups are allocated, according to the number of terminals in communications with the base station.

In the configuration, when there are a relatively few terminals in communications with the base station, the grouping scheme selecting section can select a 2-step grouping scheme so that the groups contain more terminals. Accordingly, the multi-user diversity effect is improved, and so is the system throughput.

The grouping scheme selecting section may be configured to select a 2-step grouping scheme for use by the reception quality information determining section so as to allocate to each terminal a number of groups which is determined depending on priority of data which will be transmitted from the base station to the terminals.

In the configuration, the grouping scheme selecting section can allocate more channels to terminals requesting high priority data than to terminals requesting low priority data.

Therefore, the base station can transmit the high priority data faster and more reliably to the terminals.

The grouping scheme selecting section may be configured to select a 2-step grouping scheme for use by the reception quality information determining section for each terminal.

In the configuration, the grouping scheme selecting section can optimize the 2-step grouping scheme for each terminal, thereby further reducing the amount of the reception quality information reported by the terminals to the base station.

In the communications system of the present invention, the 2-step grouping scheme may be modified so that adjacent channels form at least one of the subgroups by the 2-step grouping scheme.

Reception quality is likely to have high correlation between adjacent channels. Therefore, the dispersion of reception quality among the channels in each subgroup is reduced, and the precision of the reception quality information is improved, by arranging adjacent channels into a subgroup as in the configuration. The configuration thus optimizes the scheduling that is carried out based on the reception quality information.

A base station of the present invention is, to address the problems, characterized in that the base station is for use in a communications system including the base station and a plurality of terminals, the base station communicating wirelessly with the terminals over a plurality of channels, the base station including: a grouping scheme selecting section for selecting a 2-step grouping scheme by which the channels are divided into subgroups and the subgroups are divided into groups from a plurality of 2-step grouping schemes; a transmission section for transmitting information on the 2-step grouping scheme selected by the grouping scheme selecting section to the terminals; and a reception section for receiving, from each terminal, reception quality information representative of reception quality for the channels only for each subgroup that belongs to the group allocated to that terminal.

In the configuration, the reception section receives, from each terminal, reception quality information representative of reception quality for the channels only for each subgroup that belongs to the group allocated to that terminal. The configuration can thus reduce the amount of the reception quality information received from the terminals when compared to cases where the base station receives the reception quality information for all the channels from the terminals and where adjacent channels are arranged to form a group and the base station receives the reception quality information for each of such groups from the terminals. As a result, uplink overhead is lowered, and throughput is improved.

Furthermore, in the configuration, the base station can collectively, hence efficiently, select a 2-step grouping scheme for the terminals.

A terminal of the present invention is, to address the problems, characterized in that the terminal is for use in a communications system including a base station, the terminal, and one or more other terminals, the base station communicating wirelessly with the terminals over a plurality of channels, that terminal including: a reception quality measuring section for measuring reception quality; and a reception quality information determining section for generating, for reporting to the base station, representative reception quality information for each subgroup (i) by a 2-step grouping scheme by which the channels are divided into subgroups and the subgroups are divided into groups and (ii) according to the reception quality measured by the reception quality measuring section, wherein: the groups are allocated to the terminal by the 2-step grouping scheme; and the reception quality information determining section generates, for reporting, the representative reception quality information only for each subgroup that belongs to the group(s) allocated to the terminal.

In the configuration, the reception quality information determining section generates, for reporting, the representative reception quality information only for each subgroup that belongs to the group(s) allocated to each terminal. The configuration can thus reduce the amount of the reception quality information reported to the base station when compared to cases where the terminal reports the reception quality information for all the channels to the base station and where adjacent channels are arranged to form a group and the terminal reports the reception quality information for each of such groups to the base station. As a result, uplink overhead is lowered, and throughput is improved.

Another communications system of the present invention is, to address the problems, characterized in that the system includes a base station and a plurality of terminals, the base station communicating with the terminals over a plurality of channels, the terminals each reporting reception quality information to the base station, the base station scheduling communications over the channels according to the reception quality information reported by the terminals, the terminals each including: a reception quality measuring section for measuring reception quality; and a reception quality information determining section for generating, for reporting to the base station, reception quality information for each subgroup according to 2-step grouping scheme information by which at least one channel forms a subgroup and at least one subgroup forms a group and also according to the reception quality measured by the reception quality measuring section, wherein: each group is allocated to at least one of the terminals according to the 2-step grouping scheme information; and the reception quality information determining section in at least one of the terminals generates, for reporting, the reception quality information only for each subgroup that belongs to the group(s) allocated to that terminal by, at least under some conditions, using 2-step grouping scheme information by which some of all the groups are allocated to the terminal.

In the configuration, at least one of the terminals generates, for reporting, the reception quality information only for each subgroup that belongs to the group(s) allocated to that terminal at least under some conditions. The terminal can thus reduce the amount of the reception quality information reported to the base station when compared to cases where the terminal reports the reception quality information for all the channels to the base station and where adjacent channels are arranged to form a group and the terminal reports the reception quality information for each of such groups to the base station. As a result, uplink overhead is lowered, and throughput is improved.

"[G]enerates, for reporting, . . . by, at least under some conditions, . . . " indicates that the terminal generates, for reporting, the information either under no conditions (that is, the information is always generated for reporting) or under some conditions (that is, the information may or may not generated, for reporting, depending on some conditions).

Another base station of the present invention is, to address the problems, characterized in that the base station communicates with a plurality of terminals over a plurality of channels, the terminals each including: a reception quality measuring section and a reception quality information determining section, the reception quality measuring section measuring reception quality, the reception quality information determining section generating, for reporting to the base station, reception quality information for each subgroup according to 2-step grouping scheme information by which at least one channel forms a subgroup and at least one subgroup forms a group and also according to the reception quality measured by the reception quality measuring section, the base station scheduling communications over the channels according to the reception quality information reported by the terminals, the base station including: a first grouping scheme selecting section for selecting a set of 2-step grouping scheme information for use by the terminals from plural sets of 2-step grouping scheme information; and a transmission section for transmitting the set of 2-step grouping scheme information selected by the first grouping scheme selecting section to the terminals.

The configuration realizes the communications system of the present invention. In addition, the base station configured as above can collectively, hence efficiently, select a 2-step grouping scheme for the terminals.

Another terminal of the present invention is, to address the problems, characterized in that the terminal is for use in a communications system including a base station and a plurality of terminals, the base station communicating with the terminals over a plurality of channels, the terminals each reporting reception quality information to the base station, the base station scheduling communications over the channels according to the reception quality information reported by the terminals, the terminals each including: a reception quality measuring section for measuring reception quality; and a reception quality information determining section for generating, for reporting to the base station, reception quality information for each subgroup according to 2-step grouping scheme information by which at least one channel forms a subgroup and at least one subgroup forms a group and also according to the reception quality measured by the reception quality measuring section, wherein: some of all the groups are allocated to the terminals according to the 2-step grouping scheme information; and the reception quality information determining section generates, for reporting, the reception quality information only for each subgroup that belongs to the group(s) allocated to that terminal at least under some conditions.

In the configuration, the terminal generates, for reporting, the reception quality information only for each subgroup that belongs to the group(s) allocated to that terminal at least under some conditions. The terminal can thus reduce the amount of the reception quality information reported to the base station when compared to cases where the terminal reports the reception quality information for all the channels to the base station and where adjacent channels are arranged to form a group and the terminal reports the reception quality information for each of such groups to the base station. As a result, uplink overhead is lowered, and throughput is improved.

The present invention, as described in the foregoing, provides a communications system, and a base station and a terminal used in the system which reduces the amount of the reception quality information reported by the terminals to the base station and thus improves throughput, by carrying out efficient channel grouping.

BRIEF DESCRIPTION OF DRAWINGS

FIG. 5 is an illustration showing an example of grouping when one base station transmits data to nine mobile stations.

FIG. 7($a$) is an illustration showing a 2-step grouping scheme in which adjacent channels form a subgroup and adjacent subgroups form a group where the number of subgroups n in each group is 4.

FIG. 7($b$) is an illustration showing a 2-step grouping scheme in which adjacent channels form a subgroup and adjacent subgroups form a group where the number of subgroups n in each group is 4.

FIG. 7($c$) is an illustration showing a 2-step grouping scheme in which adjacent channels form a subgroup and adjacent subgroups form a group where the number of subgroups n in each group is 4.

FIG. 10($a$) is an illustration showing an exemplary 2-step grouping scheme in which non-adjacent subgroups form a group.

FIG. 10($b$) is an illustration showing an exemplary 2-step grouping scheme in which non-adjacent subgroups form a group.

FIG. 11 is an illustration showing an exemplary 2-step grouping scheme in which each group contains a different number of subgroups.

FIG. 12($a$) is an illustration showing exemplary allocation of groups to mobile stations according to the priority of data which will be transmitted to a mobile station.

FIG. 12($b$) is an illustration showing exemplary allocation of groups to mobile stations according to the priority of data which will be transmitted to a mobile station.

BEST MODE FOR CARRYING OUT INVENTION

Embodiment 1

The following will describe an embodiment of the present invention in reference to FIGS. 1 and 4 to 6. The present embodiment will focus on a system which is set up in advance for a 2-step grouping scheme. Both the base station and the mobile stations are set up in advance for the same 2-step grouping scheme.

The term "channel" used hereinafter refers to a minimum frequency unit in allocating channels to mobile stations by scheduling. Note that the channel can be time-shared by different mobile stations. This is a similar concept to, for example, "chunking" in the E-UTRA (Evolved UMTS Terrestrial Radio Access) the standardization work for which is in progress under the 3GPP (3rd Generation Partnership Project).

The following description is made based on a communications system in which transmission data, control information, and pilot signals are arranged for each frame.

Figure 1:
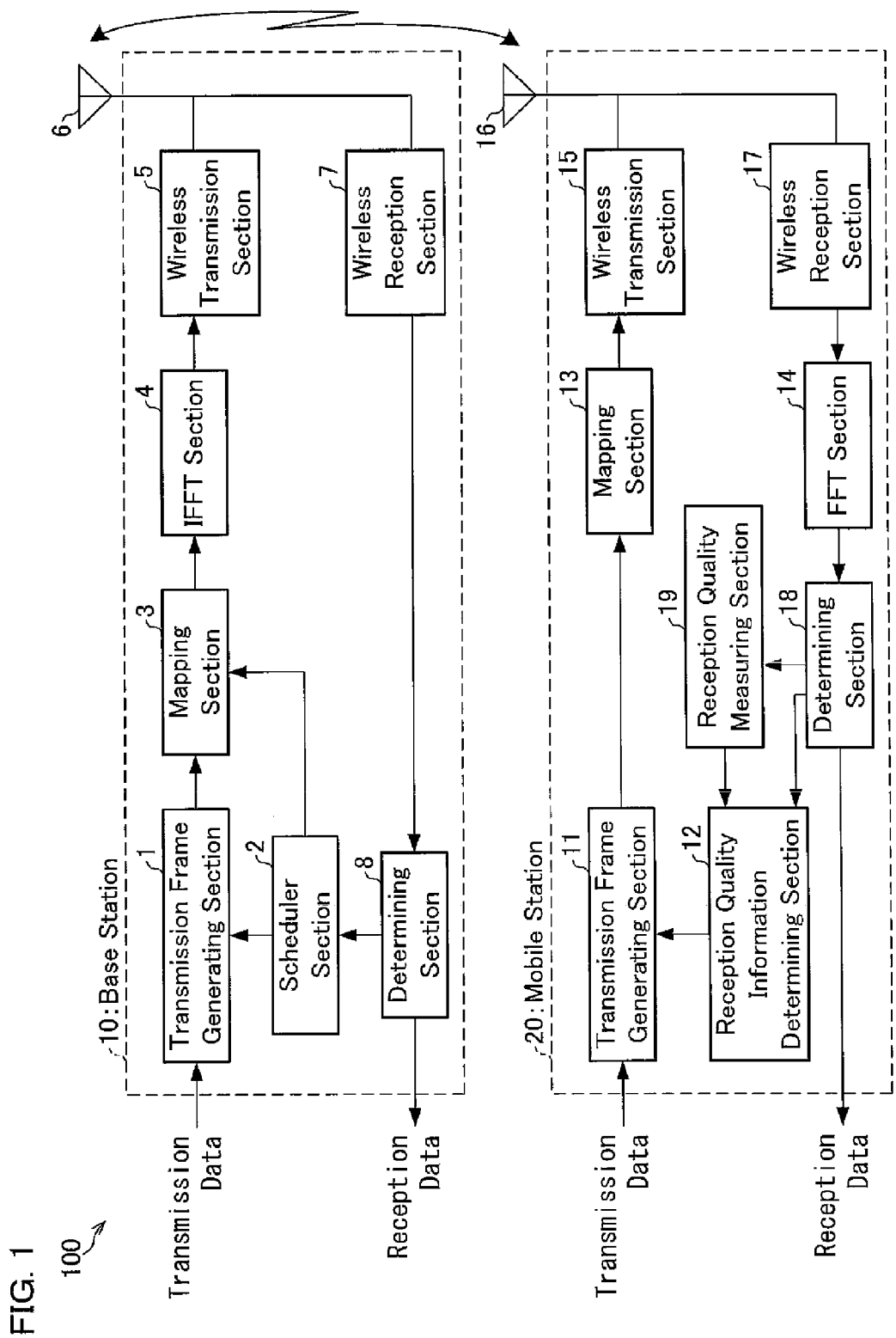
FIG. 1 is a block diagram showing the structure of an OFDMA system as a communications system in accordance with an embodiment of the present invention.

FIG. 1 is a block diagram showing the structure of an OFDMA system as a communications system in accordance with the present embodiment. As illustrated in FIG. 1, an OFDMA system 100 in accordance with the present embodiment includes a base station 10 and a mobile station (terminal) 20, the base station 10 communicating with the mobile station 20 over a plurality of channels. Although FIG. 1 shows only one base station 10 and only one mobile station 20, the OFDMA system in accordance with the present embodiment includes multiple mobile stations 20 only one of which is shown in FIG. 1.

The base station 10 contains a transmission frame generating section 1, a scheduler section 2, a mapping section 3, an IFFT (Inverse Fast Fourier Transform) section 4, a wireless transmission section 5, an antenna 6, a wireless reception section 7, and a determining section 8. The base station 10 includes a data processing section (not shown) which receives incoming data from the determining section 8 and which provides the transmission frame generating section 1 with data (transmission data) which will be transmitted to the mobile station 20.

Each mobile station 20 includes a transmission frame generating section 11, a reception quality information determining section 12, a mapping section 13, an FFT (Fast Fourier Transform) section 14, a wireless transmission section 15, an antenna 16, a wireless reception section 17, a determining section 18, and a reception quality measuring section 19. The mobile station 20 includes a data processing section (not shown) which receives incoming data from the determining section 18 and which provides the transmission frame generating section 11 with data which will be transmitted.

Next will be described the operation of the base station 10 shown in FIG. 1 in a downlink transmission.

First, the data which will be transmitted to the mobile station 20 (transmission data) is supplied from the data processing section (not shown) to the transmission frame generating section 1. Next, the transmission frame generating section 1 generates transmission frames from the data which will be transmitted to the mobile station 20 according to scheduling information and MCS (Modulation and channel Coding Scheme) information (a modulation scheme, coding ratio, etc.) provided by the scheduler section 2. The transmission frame generating section 1 generates control information based on which the scheduling information provided by the scheduler section 2 is communicated to the mobile station 20 and multiplexes the control information into the transmission frames.

The mapping section 3 then maps each transmission frame to the channels according to the scheduling information provided by the scheduler section 2 to convert the transmission frame to a series of a total of Nc×Ns symbols (Nc symbols in terms frequency and Ns symbols in terms of time; Nc is an integer greater than or equal to 2; Ns is a natural number). A series of pilot symbols (pilot signal) is, if necessary, added as part of this series of symbols for the purpose of reception quality measurement.

Next, the IFFT section 4 performs IFFT (Inverse Fast Fourier Transform) on the series of a total of Nc×Ns symbols mapped to the channels to obtain a series of Ns OFDM symbols (OFDM signal) in terms of time. Nc samplings are made for each OFDM symbol. The IFFT section 4 sends the resultant series of OFDM symbols to the wireless transmission section 5. The wireless transmission section 5 transmits the series of OFDM symbols provided by the IFFT section 4 to the mobile station 40 on a carrier wave of a predetermined frequency from the antenna 6.

Next will be described the operation of the mobile station 20 shown in FIG. 1 in a downlink reception.

First, the wireless reception section 17 receives the series of OFDM symbols transmitted by the base station 10 via the antenna 16. The FFT section 14 performs FFT (Fast Fourier Transform) on the reception signal (series of OFDM symbols) received by the wireless reception section 17 from the base station 10 to obtain a series of a total of Nc×Ns symbols. Here, the FFT section 14 and the IFFT section 4 execute inverse processes. Thereafter, the determining section 18 extracts the control information and the reception data (and pilot signal) from the series of a total of Nc×Ns symbols (reception signal). The determining section 18 sends the extracted reception data (and pilot signal) to the reception quality measuring section 19 and a data processing section (not shown).

Next, the reception quality measuring section 19 measures reception quality of the pilot signal or the series of reception data (reception signal) sent from the determining section 18 for each channel. In the following description, the SIR (Signal-to-Interference power Ratio) will be used as the reception quality. The SIR is a ratio of the electric power of a signal to the electric power of an interference signal (interference noise). Alternatively, the reception quality may be an indicator related with the electric power of a reception signal or of an incoming carrier wave or an indicator related with the success/failure of frame reception. The former indicator is, for example, the RSSI (Received Signal Strength Indicator) or the CNR (Carrier to Noise Ratio). The latter indicator is, for example, the BER (Bit Error Rate) or the PER (Packet Error Rate).

Next, the reception quality information determining section 12 generates CQI (reception quality information) from the measured SIR values according to predetermined grouping scheme information settings. The reception quality information determining section 12 divides channels into subgroups and further divides the subgroups into groups in order to generate, for each subgroup in the group to which the mobile station 20 belongs, one CQI that is representative of the CQIs of the channels in that subgroup. Grouping will be detailed later.

Next will be described the operation of the mobile station 20 shown in FIG. 1 in an uplink transmission.

First, the data processing section (not shown) provides the transmission frame generating section 11 with data which will be transmitted to the base station 10 (transmission data). Next, the transmission frame generating section 11 generates transmission frames from the data which will be transmitted to the base station 10 (digital signal), by multiplexing the CQI provided by the reception quality information determining section 12 into the transmission frames.

The mapping section 13 then maps each transmission frame to the channels and sends the frames to the wireless transmission section 15. The wireless transmission section 15 transmits the mapped transmission frames provided by the mapping section 13 to the base station 10 from the antenna 16.

Next will be described the operation of the base station 10 shown in FIG. 1 in an uplink reception.

First, the wireless reception section 7 receives the transmission frames transmitted from the mobile station 20 via the antenna 6. The determining section 8 extracts the reception data and control information containing the CQI from the reception signal (transmission frames) received by the wireless reception section 7 from the mobile station 20. The determining section 8 sends the CQI to the scheduler section 2 and the reception data to the data processing section (not shown).

Next, the scheduler section 2 schedules data transmissions to the mobile stations 20 according to the CQI provided by the determining section 8 and the predetermined grouping scheme information settings stored in the base station 10. The scheduler section 2 communicates scheduling information and MCS information to the transmission frame generating section 1 and the scheduling information to the mapping section 3. Scheduling will be detailed later.

The foregoing description was made on an assumption that the base station 10 and the mobile stations 20 snare the same predetermined grouping scheme information settings. Alternatively, only the base station 10 may be set up for a 2-step grouping scheme; when the base station 10 sends a call setup request to the mobile stations 20, the base station 10 sends grouping scheme information to the mobile stations 20 so that the mobile stations 20 can use the grouping scheme information in subsequent communications.

The following will describe grouping and scheduling.

Figure 4:
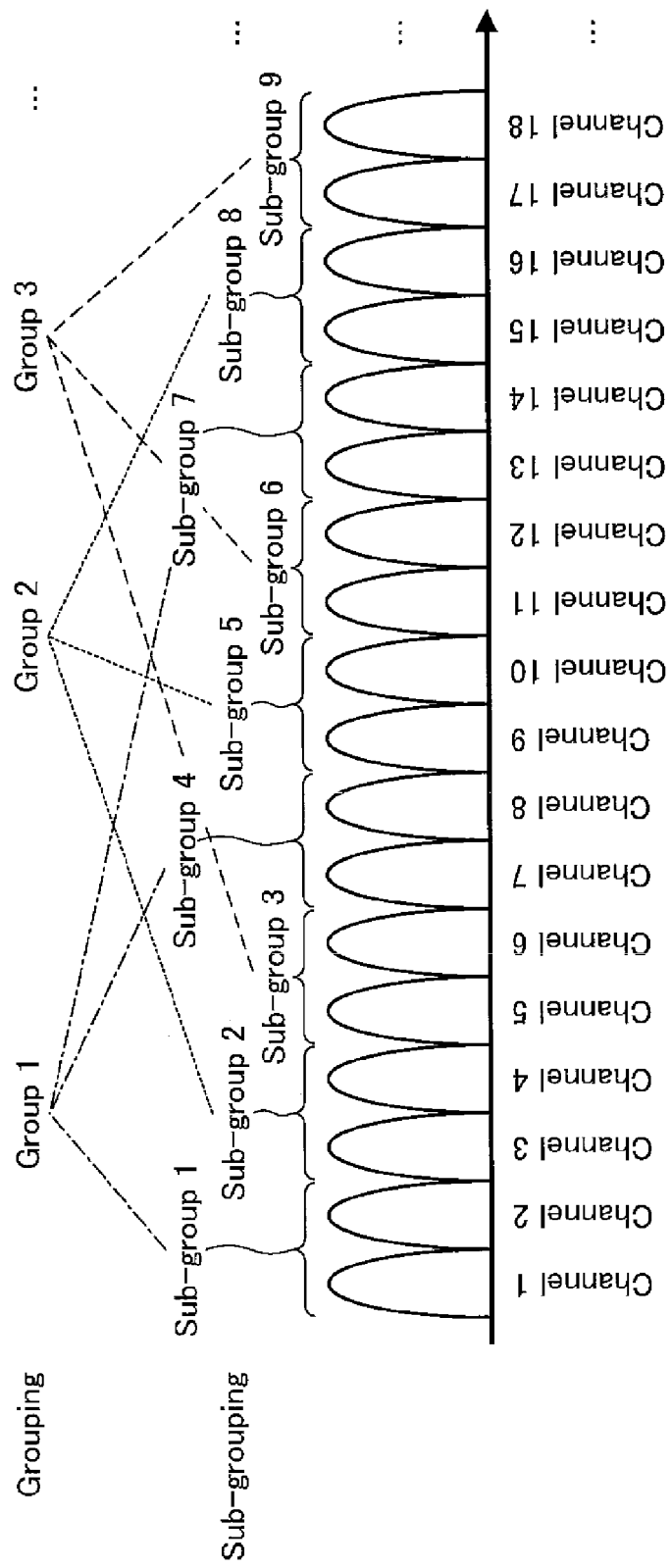
FIG. 4 is an illustration showing how frequency channels are divided into subgroups and also how subgroups are divided into groups.

FIG. 4 illustrates how frequency channels are divided into subgroups and also how subgroups are divided into groups.

FIG. 4 shows an example in which each group contains the same number of subgroups and each subgroup contains the same number of channels. Also in the example, adjacent channels form a subgroup. Also in the example, subgroups are arranged into groups so that the difference in channel number between subgroups (difference in frequency) can be overall the greatest. FIG. 4 is an example of grouping in which each subgroup contains two channels and each group contains three subgroups.

In this example, of all channels 1 to 18 allocated to the mobile stations 20, channels 1 and 2 form subgroup 1; channels 3 and 4 form subgroup 2; channels 5 and 6 form subgroup 3; channels 7 and 8 form subgroup 4; channels 9 and 10 form subgroup 5; channels 11 and 12 form subgroup 6; channels 13 and 14 form subgroup 7; channels 15 and 16 form subgroup 8; and channels 17 and 18 form subgroup 9, as illustrated in FIG. 4. Also in this example, subgroups 1, 4, and 7 form group 1; subgroups 2, 5, and 8 form group 2; and subgroups 3, 6, and 9 form group 3, as illustrated in FIG. 4.

Each mobile station 20 belongs to one or more groups. The mobile station 20 reports to the base station 10 the CQI for each subgroup in the group to which the mobile station 20 belongs.

FIG. 5 shows an example of grouping in which a single base station 10 transmits data to nine mobile stations 20 (hereinafter, "mobile stations UE1 to UE9").

In the example shown in FIG. 5, the mobile stations UE1 to UE9 are grouped so that each mobile station UE1 to UE9 belongs to only one group and also that each group contains the same number of mobile stations.

As illustrated in FIG. 5, the three mobile stations UE1, UE5, and UE9 belong to group 1, the three mobile stations UE2, UE3, and UE7 belong to group 2, and the three mobile stations UE4, UE6, and UE8 belong to group 3. In the example in FIG. 5, the mobile stations UE1 to UE9 each report to the base station 10 the CQI for each of the three subgroups in the group to which that mobile station belongs. For example, the mobile station UE1 belongs to group 1; the mobile station UE1 feeds back to the base station 10 the CQI for the three subgroups which belong to group 1, i.e. subgroups 1, 4, and 7.

For that purpose, the reception quality information determining section 12 calculates a representative measured reception quality value for channels 1 and 2 in subgroup 1 (in this case, the SIR as measured by the reception quality measuring section 19) as the CQI for subgroup 1. Similarly, the reception quality information determining section 12 calculates a representative measured reception quality value for channels 7 and 8 in subgroup 4 as the CQI for subgroup 4 and a representative measured reception quality value for channels 13 and 14 in subgroup 7 as the CQI for subgroup 7. The reception quality information determining section 12 sends the calculated CQI to the transmission frame generating section 11.

Here, the representative one of measured reception quality values may be calculated by any of the following methods. A weighted average of the elements (measured reception quality values for all channels in a subgroup) in a parent set (measured reception quality values for those channels) may be calculated as the representative value. Any element (e.g. the measured reception quality value for the first channel or the smallest measured reception quality value) in the parent set may be designated the representative value. Alternatively, the mobile stations 20 may measure the SIR for each subgroup with the reception quality measuring section 19 so that the reception quality information determining section 12 can calculate the CQI from the SIR as measured for each subgroup.

As described in the foregoing, in the OFDMA system 100 of the present embodiment, m channels are arranged into subgroups (m is an integer greater than or equal to 2; m=2 in the examples in FIGS. 4 and 5) so that the mobile stations 20 can report a CQI for each subgroup to the base station 10. Accordingly, the amount of the CQI information reported by the mobile stations 20 to the base station 10 is reduced by a factor of 1/m over a case where the mobile stations 20 report a CQI for each channel to the base station 10.

In addition, as described in the foregoing, in the OFDMA system 100 of the present embodiment, each group contains n subgroups (n is a natural number; n=3 in the examples in FIGS. 4 and 5), all the channels allocated to the mobile stations 20 are divided into p groups (p is an integer greater than or equal to 2; p=3 in the examples in FIGS. 4 and 5) so that each mobile station 20 belongs to only one group, and each mobile station 20 reports to the base station 10 only the CQI for the n subgroups in the group to which the mobile station 20 belongs. Therefore, the amount of the CQI information reported by the mobile stations 20 to the base station 10 is reduced by another factor of 1/p over a case where the mobile stations 20 report a CQI for each subgroup to the base station 10.

That is, in the OFDMA system 100 of the present embodiment, by the virtue of the grouping and subgrouping (2-step grouping), the amount of the CQI information reported by the mobile stations 20 to the base station 10 is reduced by a factor of $1/(m \times p)$ (1/6 in the examples in FIGS. 4 and 5) over a case where the mobile stations 20 report a CQI for each channel ($m \times n \times p$ channels) to the base station 10.

According to the CQI provided by the mobile stations 20 in each group, the scheduler section 2 schedules data transmissions to these mobile stations 20 (assigns data which will be transmitted to the mobile stations 20 to channels). For example, the scheduler section 2 schedules data transmissions to the three mobile stations UE1, UE5, and UE9 which belong to group 1 according to the CQI provided by the stations UE1, UE5, and UE9. Multi-user diversity effect is thus achieved.

Figure 6:
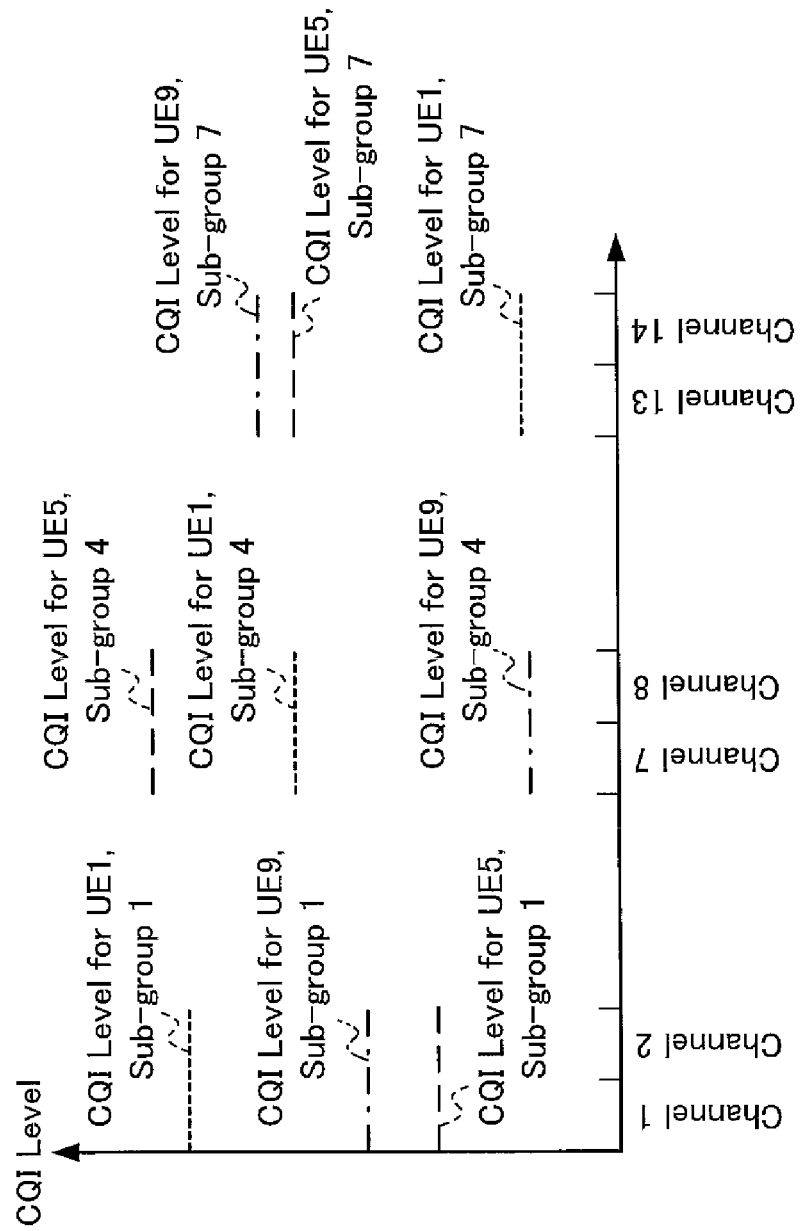
FIG. 6 is an illustration showing example distributions of CQI levels for three mobile stations in a single group.

FIG. 6 illustrates example distributions of CQI levels for the three mobile stations UE1, UE5, and UE9 which belong to the same group (group 1). In channels 1 and 2, the CQI level is highest with the mobile station UE1 and then falls sequentially with the mobile station UE9 and the mobile station UE5. The CQI level, in channels 7 and 8, is highest with the mobile station UE5 and then falls sequentially with the mobile station UE1 and the mobile station UE9. In channels 13 and 14, the CQI level is highest with the mobile station UE9 and then falls sequentially with the mobile station UE5 and the mobile station UE1.

The scheduler section 2 performs scheduling to allocate channels to the mobile stations 20 according to these CQI levels. Various techniques are being proposed for the CQI-based scheduling: maximum CIR schemes (CIR is made maximum), proportional fairness schemes (the proportion of the instantaneous SIR to the average SIR measured over a predetermined period [=instantaneous SIR/average SIR] is made maximum), etc. The scheduler section 2 is capable of scheduling by such a technique.

In the example in FIG. 6, the destination mobile stations 20 with which the CQI level is highest is the mobile station UE1 in channels 1 and 2, the mobile station UE5 in channels 7 and 8, and the mobile station UE9 in channels 13 and 14. Therefore, If a maximum CIR scheme is applied to the example in FIG. 6, the data which will be transmitted to the mobile station UE1 is assigned to channels 1 and 2, the data which will be transmitted to the mobile station UE5 is assigned to channels 7 and 8, and the data which will be transmitted to the mobile station UE9 is assigned to channels 13 and 14. That optimizes throughput for group 1. Similar scheduling on all the other groups optimizes throughput for all the groups.

A maximum CIR scheme is used in the example described here. Therefore, the same mobile station 20 is allotted to each channel in a subgroup. Another possible way of scheduling is to allot different mobile stations 20 to each channel in a subgroup. In other words, the subgroup is a unit for CQI reporting done by the mobile stations 20, not necessarily the minimum frequency unit for scheduling.

The mobile stations 20 may report information representing values obtained by quantizing a transfer rate corresponding to the SIR measured with the reception quality measuring section 19 as the CQI to the base station 10 so that the base station 10 can select a transfer rate (which may be a transfer rate equal to a CQI level reported by a mobile station 20 or that transfer rate plus some increment/decrement added by the base station 10) according to the CQI levels reported by the mobile stations 20. The mobile stations 20 may report information representing values obtained by quantizing the SIR measured with the reception quality measuring section 19 as the CQI to the base station 10 so that the base station 10 can select a transfer rate which corresponds to a CQI level reported by a mobile station 20. The CQI for a subgroup formed by multiple channels may be a value obtained by quantizing a transfer rate corresponding to a representative SIR calculated for the channels in the subgroup or may be a representative one of the values obtained by quantizing a transfer rate corresponding to the SIRs for the channels in the subgroup.

Embodiment 2

The following will describe another embodiment of the present invention in reference to FIGS. 2, 3, and 7(a) to 10(b). Here, for convenience in description, members of the present embodiment that have the same arrangement and function as members of embodiment 1 and that are mentioned in that embodiment are indicated by the same reference numerals and description thereof is omitted.

Needless to say, uplink overhead becomes very large if a mobile station sends a large amount of information to the base station to notify of a 2-step grouping scheme. The invention in accordance with the present embodiment has an objective of providing a multicarrier wireless communications system capable of efficient grouping of multiple subcarriers with a reduced amount of information that is transmitted to notify of a 2-step grouping scheme, to control the grouping to achieve improved throughput while reducing the amount of control information.

The present embodiment will focus on cases where the base station adaptively selects a 2-step grouping scheme. In the present embodiment, a 2-step grouping scheme is determined in such a way that once the number of groups is determined, the number of channels contained in each subgroup is automatically determined.

Figure 2:
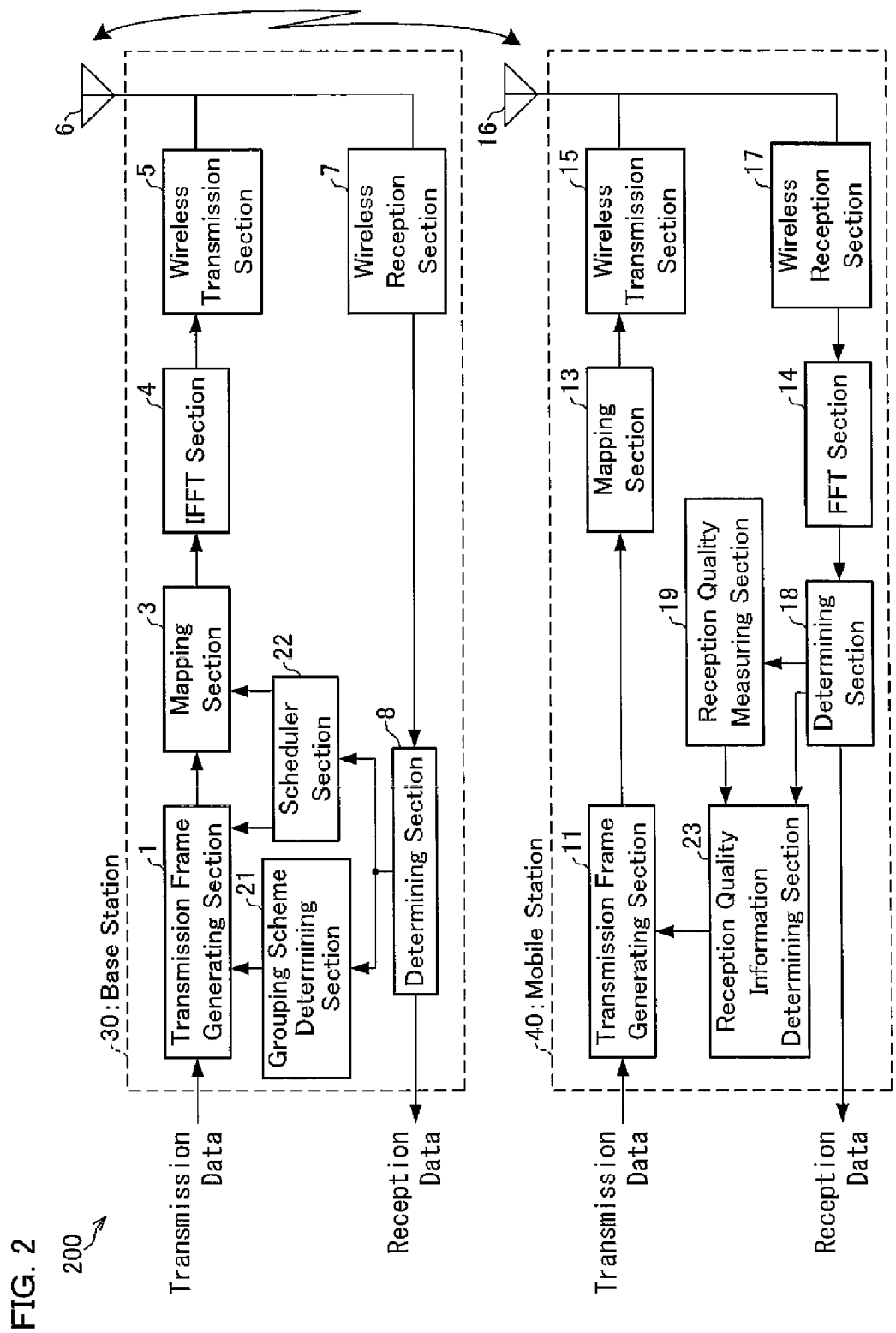
FIG. 2 is a block diagram showing the structure of an OFDMA system as a communications system in accordance with another an embodiment of the present invention.

FIG. 2 is a block diagram showing an example of the structure of an OFDMA system in embodiment 2. As illustrated in FIG. 2, the OFDMA system 200 in accordance with the present embodiment includes a base station 30 and a mobile station (terminal) 40, the base station 30 communicating with the mobile station 40 over a plurality of channels. Although FIG. 2 shows only one base station 30 and only one mobile station 40, the OFDMA system in accordance with the present embodiment includes multiple mobile stations 40 only one of which is shown in FIG. 2.

The base station 30 has the same configuration as the base station 10 in embodiment 1 except that the station 30 contains a scheduler section 22 in place of the scheduler section 2 and also that the station 30 further contains a grouping scheme determining section (grouping scheme selecting section) 21.

Each mobile station 40 has the same configuration as the mobile station 20 of embodiment 1 except that the mobile station 40 contains a reception quality information determining section 23 in place of the reception quality information determining section 12.

Next will be described the operation of the base station 30 shown in FIG. 2 in a downlink transmission.

First, the data which will be transmitted to the mobile station 40 (transmission data) is supplied from the data processing section (not shown) to the transmission frame generating section 1. Next, the transmission frame generating section 1 generates transmission frames from the data which will be transmitted to the mobile station 40 according to scheduling information and MCS information provided by the scheduler section 22. The transmission frame generating section 1 generates control information based on which the scheduling information provided by the scheduler section 2 is communicated to the mobile station 20 and multiplexes the control information into the transmission frames.

The mapping section 3 then maps the transmission frames to the channels according to the scheduling information provided by the scheduler section 22 to convert the transmission frames to a series of a total of Nc×Ns parallel symbols (Nc symbols in terms frequency and Ns symbols in terms of time; Nc is an integer greater than or equal to 2; Ns is a natural number).

Next, the IFFT section 4 performs IFFT on the series of a total of Nc×Ns symbols mapped to the channels to obtain a series of Ns OFDM symbols (OFDM signal) in terms of time. Nc samplings are made for each OFDM symbol. The IFFT section 4 sends the resultant series of OFDM symbols to the wireless transmission section 5. The wireless transmission section 5 transmits the series of OFDM symbols provided by the IFFT section 4 to the mobile station 40 on a carrier wave of a predetermined frequency from the antenna 6.

Next will be described the operation of the mobile station 40 shown in FIG. 2 in a downlink reception.

First, the wireless reception section 17 receives the series of OFDM symbols transmitted by the base station 30 via the antenna 16. The FFT section 14 performs FFT on the reception signal (series of OFDM symbols) received by the wireless reception section 17 from the base station 30 to obtain a series of a total of Nc×Ns symbols. Here, the FFT section 14 and the IFFT section 4 execute inverse processes. Thereafter, the determining section 18 extracts the control information and the reception data (and pilot signal), containing the grouping scheme information, from the series of a total of Nc×Ns symbols (reception signal). The determining section 18 sends the extracted control information containing the grouping scheme information to the reception quality information determining section 23. The determining section 18 sends the extracted reception data (and pilot signal) to the reception quality measuring section 19 and a data processing section (not shown).

Next, the reception quality measuring Section 19 measures reception quality of the pilot signal or the series of reception data for each channel. Here, the reception quality measuring section 19 measures the SIR as the reception quality.

Next, the reception quality information determining section 23 generates CQI (reception quality information) from the measured reception quality value according to the grouping scheme information transmitted from by the base station 30 and extracted by the determining section 18. The reception quality information determining section 23 divides channels into subgroups and further divides the subgroups into groups in order to generate, for each subgroup in the group to which the mobile station 40 belongs, one CQI (reception quality information) for output to the transmission frame generating section 11. Grouping will be detailed later.

Figure 3:
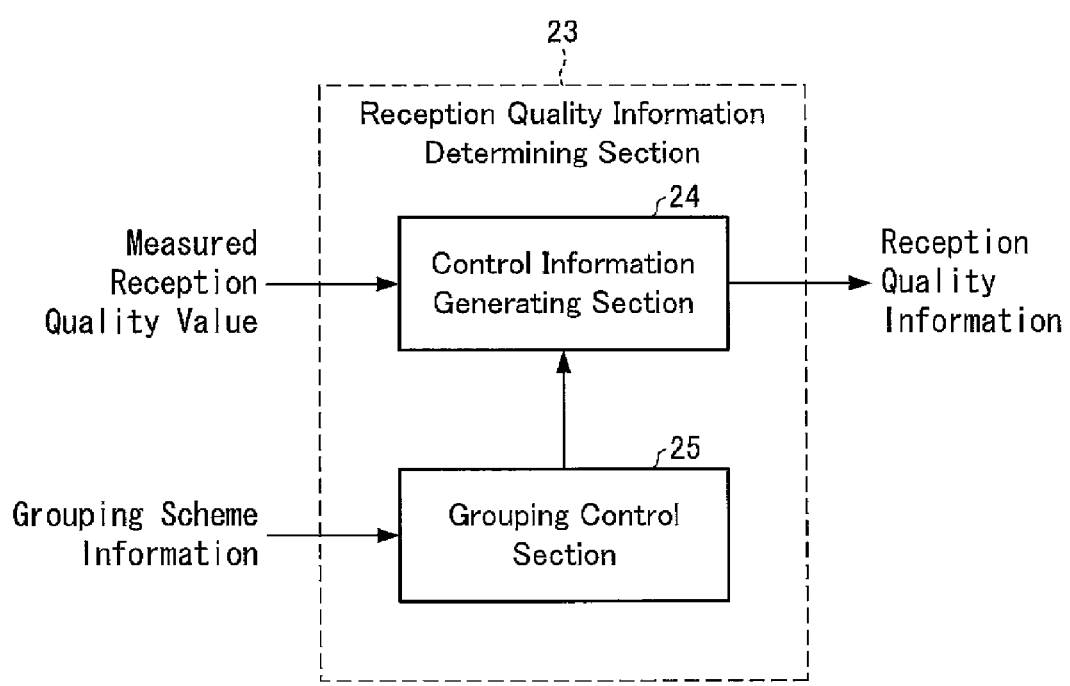
FIG. 3 is a block diagram showing the structure of a reception quality information determining section in the OFDMA system shown in FIG. 2.

The reception quality information determining section 23, as illustrated in FIG. 3, includes a control information generating section 24 and a grouping control section 25. The control information generating section 24 generates CQI (reception quality information) from the measured reception quality value while carrying out grouping and subgrouping according to the grouping scheme information. The grouping control section 25 controls the grouping (grouping and subgrouping) scheme carried out by the control information generating section 24.

Next will be described the operation of the mobile station 40 shown in FIG. 2 in an uplink transmission.

First, the data which will be transmitted to the base station 10 (transmission data) is supplied from the data processing section (not shown) to the transmission frame generating section 11. Next, the transmission frame generating section 11 generates transmission frames from the data which will be transmitted to the base station 30, by multiplexing the CQI provided by the reception quality information determining section 23 (reception quality information) into the transmission frames and similarly multiplexing a control signal containing the grouping scheme information provided by the reception quality information determining section 23 into the transmission frames.

The mapping section 13 then maps the transmission frames to the channels and send the frames to the wireless transmission section 15. The wireless transmission section 15 transmits the mapped transmission frames provided by the mapping section 13 to the base station 30 from the antenna 16.

The grouping scheme information generated by the grouping scheme determining section 21 as will be detailed later may be stored in the base station 30. In that case, the mobile station 40 does not need to report the grouping scheme information to the base station 30. Therefore, if the base station 30 stores the grouping scheme information, the transmission frame generating section 1 does not need to multiplex the grouping scheme information into the transmission frames.

Next will be described the operation of the base station 30 shown in FIG. 2 in an uplink reception.

First, the wireless reception section 7 receives the transmission frames transmitted from the base station 30 via the antenna 6. The determining section 8 extracts the reception data and control information containing the CQI and the grouping scheme information from the reception signal (transmission frames) received by the wireless reception section 7 from the mobile station 40. The determining section 8 sends the control information containing the CQI and grouping scheme information to the scheduler section 22 and the grouping scheme determining section 21.

The grouping scheme determining section 21 determines a 2-step grouping scheme and generates grouping scheme information according to the CQI provided by the determining section 8 and the dispersion (detailed later) of CQI levels in each subgroup. It will be detailed later how a 2-step grouping scheme is determined.

The scheduler section 22 schedules data transmissions to the mobile stations 40 according to the CQI and the grouping scheme information provided by the determining section 8.

The following will describe, as an example, a method of the grouping scheme determining section 21 determining a 2-step grouping scheme in the present embodiment.

If each mobile station 40 belongs any one of the groups, the amount of the CQI information reported to the base station 30 is determined depending on the number of subgroups n (n is a natural number) in that group. Assume that the system has a total of W channels (W is constant) available for allocation to the mobile stations 20, each subgroup contains the same number of channels (=m; m is a natural number), and each group contains the same number of subgroups (=n). Under these conditions, letting the number of groups be p (p is a natural number), m×n×p=W. Therefore, if the number of subgroups n per group is fixed and the number of groups p is set to a particular value, the number of channels m in the subgroup is determined uniquely.

The following will describe an exemplary method of determining a 2-step grouping scheme by the procedures above.

The method controls the number of groups p by fixing the total number, W, of the channels that are allocated to the mobile stations 20 and the number of subgroups n in each group and by equalizing the numbers of channels in the individual subgroups. The method hence improves CQI precision (precision of reported SIR values) by controlling the number of groups p while reducing the amount of the grouping scheme information.

FIG. 7 illustrates a 2-step grouping scheme in which adjacent channels form a subgroup and adjacent subgroups form a group where each group contains n=4 subgroups. Three 2-step grouping schemes may be possible which are shown in FIGS. 7(a), 7(b), and 7(c). In all these grouping schemes, groups of channels are allocated to the mobile stations 40 in the same manner as in FIG. 5.

The grouping scheme determining section 21 in the base station 30 selects one of the 2-step grouping schemes according to the CQI reported by the mobile stations 40.

In all these 2-step grouping schemes, m channels are divided into subgroups, and the mobile stations 20 report a CQI for each subgroup to the base station 10. Also in all the 2-step grouping schemes, n subgroups are divided into groups, all the channels which will be allocated to the mobile stations 20 are divided into p groups, and the mobile stations 20 each belong to only one group and report to the base station 10 only the CQI for the n subgroups in the group to which that mobile station 20 belongs.

The number of subgroups n in each group is fixed to 4 in the three 2-step grouping schemes shown in FIGS. 7(a), 7(b), and 7(c). Therefore, the mobile station 20 reports four CQIs to the base station 10 in the three 2-step grouping schemes. Therefore, all the 2-step grouping schemes reduce the amount of the CQI information reported by the mobile stations 20 to the base station 10 by a factor of 1/(m×p), that is, 1/4 over a case where the mobile stations 20 report a CQI for each of the 16 channels to the base station 10. Some of the 2-step grouping schemes (those shown in FIGS. 7(a) and 7(b)) sets the number of groups p to 2 or greater. Therefore, the schemes reduce the amount of the CQI information reported by the mobile stations 20 to the base station 10 by a factor of 1/p over a case where adjacent channels form a group and the mobile stations 20 report a CQI for each group to the base station 10.

The number of groups p is 4, 2, and 1 in the three 2-step grouping schemes shown respectively in FIGS. 7(a), 7(b), and 7(c). The grouping scheme determining section 21 changes the number of groups p between 4, 2, and 1 by switching between the three 2-step grouping schemes.

In this method, each group contains a fixed number (=n) of subgroups. The number of channels m in each subgroup therefore varies in inverse proportion to the number of groups p. As the number of groups p changes from 4 to 2 and to 1 in the examples shown in FIGS. 7(a), 7(b), and 7(c), the number of channels m in each subgroup changes from 1 to 2 and to 4. Therefore, the grouping scheme determining section 21 changes the number of groups p and at the same time changes the number of channels m in each subgroup between 1, 2, and 4 by switching between the three 2-step grouping schemes.

As described in the foregoing, the foregoing configuration reduces the amount of information by which the mobile station 20 notifies the base station 10 of a grouping scheme. If the number of subcarriers n in each group is not fixed, the mobile station 20 needs to send to the base station 10 information by which the number of groups p is identified and information by which the number of channels m in each subgroup is identified. In contrast, the foregoing configuration fixes the number of subcarriers n in each group. The base station 10 can determine both the number of groups p and the number of channels m in each subgroup if the mobile stations 20 transmits to the base station 10 information by which to identify the number of groups p.

Furthermore, if the number of subcarriers n in each group is fixed, the amount of reception quality information for each group becomes constant. This is especially effective in mobile phone systems to which the present invention may be applied because the systems allow for limited amounts of control information.

Next will be described some examples of the control method for the 2-step grouping schemes in the grouping scheme determining section 21.

Figure 8:
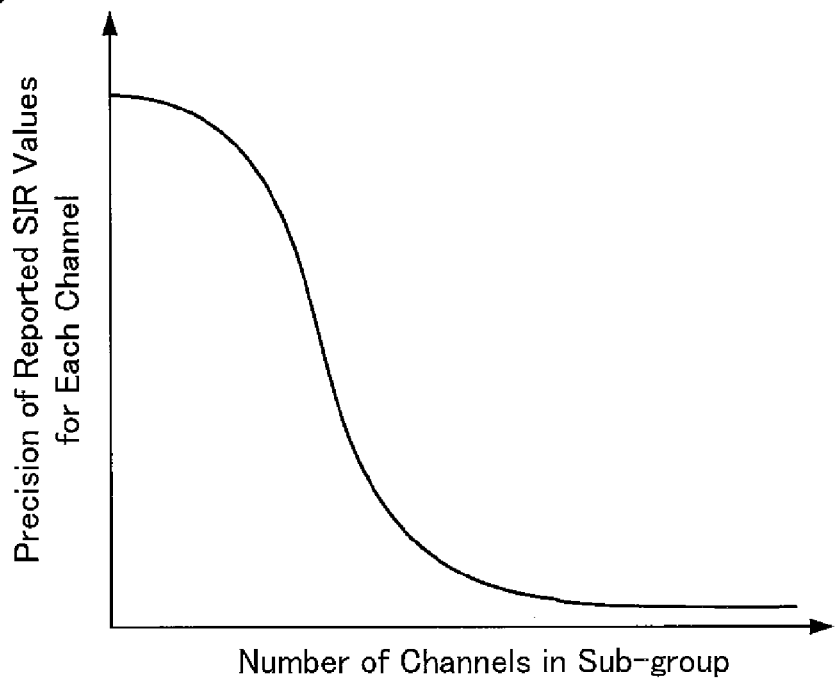
FIG. 8 is an illustration showing an example of changes in the precision of reported SIR values for each channel of a subgroup.

FIG. 8 illustrates an example of changes in the precision of reported SIR values for each of the m channels in a subgroup. The characteristics indicate that as the number of channels m in the subgroup increases, the SIR values for each channel in the subgroup will have a greater dispersion, lowering the precision of the reported SIR values for each channel and hence transmission quality.

Accordingly, the grouping scheme determining section 21 changes the number of channels m in each subgroup according to the dispersion of CQI levels in the subgroup. Specifically, the grouping scheme determining section 21 controls the 2-step grouping schemes so that when the CQI levels in a subgroup shows a large dispersion, the number of groups p is increased to decrease the number of channels m in the subgroup. That control lowers the dispersion of the CQI levels, improving the precision of the reported SIR values for the channel and transmission quality.

The grouping scheme determining section 21 is adapted so that the section 21 can obtain information on the dispersion of CQI levels in each subgroup. The grouping scheme determining section 21 obtains information on the dispersion of CQI levels in a subgroup and controls a 2-step grouping scheme according to that information, for example, by the following method.

(1) The mobile stations 40 reports to the base station 30 information on the dispersion of CQI levels in the subgroup, separately from the CQI. To describe it in more detail, for example, first, the reception quality information determining section 23 calculates the dispersion of CQI levels in the subgroup from the grouping scheme information and the CQI (reception quality information) levels. The section 23 then sends this information on the dispersion of CQI levels in the subgroup to the transmission frame generating section 11. The transmission frame generating section 11 multiplexes the information on the dispersion of the CQI levels along with the CQI into the transmission frames, for transmission to the base station 30 via the wireless transmission section 15 and the antenna 16. The wireless reception section 7 receives the transmitted information on the dispersion of the CQI levels via the antenna 6. The determining section 8 extracts and sends the information to the grouping scheme determining section 21. If the dispersion of the CQI levels in the subgroup is large, for example, if the dispersion of the CQI levels in the subgroup is larger than a threshold, the grouping scheme determining section 21 switches between 2-step grouping schemes in such a manner as to increase the number of groups p.

(2) Generally, the mobile stations report a success/failure of data reception (so-called ACK and NACK) to the base station. If the CQI levels show a large dispersion, data reception is likely to fail. Accordingly, the mobile stations 40 report a success/failure of data reception (so-called ACK/NACK) to the base station 30 so that the grouping scheme determining section 21 in the base station 30 can determine from the information on success/failure of data reception if the dispersion of the CQI levels is large or small. To describe it in more detail, if the grouping scheme determining section 21 receives failed data reception information (so-called NACK information) or receives failed data reception information (NACK information) over several consecutive frames, the section 21 determines that the dispersion of the CQI levels is large and changes 2-step grouping schemes so as to increase the number of groups p.

(3) When adjacent channels are arranged into a subgroup, if downlink delay dispersion grows, the dispersion of the CQI levels in the subgroup will likely grow. Therefore, the mobile stations 40 generate information on the downlink delay dispersion and report the information to the base station 30 separately from the CQI, in the same manner as the generation and reporting of the information on the dispersion of the CQI levels in (1). If the downlink delay dispersion is large, for example, if the downlink delay dispersion is larger than a threshold, the grouping scheme determining section 21 switches between 2-step grouping schemes in such a manner as to increase the number of groups p.

(4) The downlink delay dispersion would likely be related to the uplink delay dispersion. Therefore, the grouping scheme determining section 21 could determine that if the uplink delay dispersion is large, the dispersion of the CQI levels in the subgroup is also large. If the uplink delay dispersion is large, for example, if the uplink delay dispersion is larger than a threshold, the grouping scheme determining section 21 may switch between 2-step grouping schemes in such a manner as to increase the number of groups p.

Figure 9:
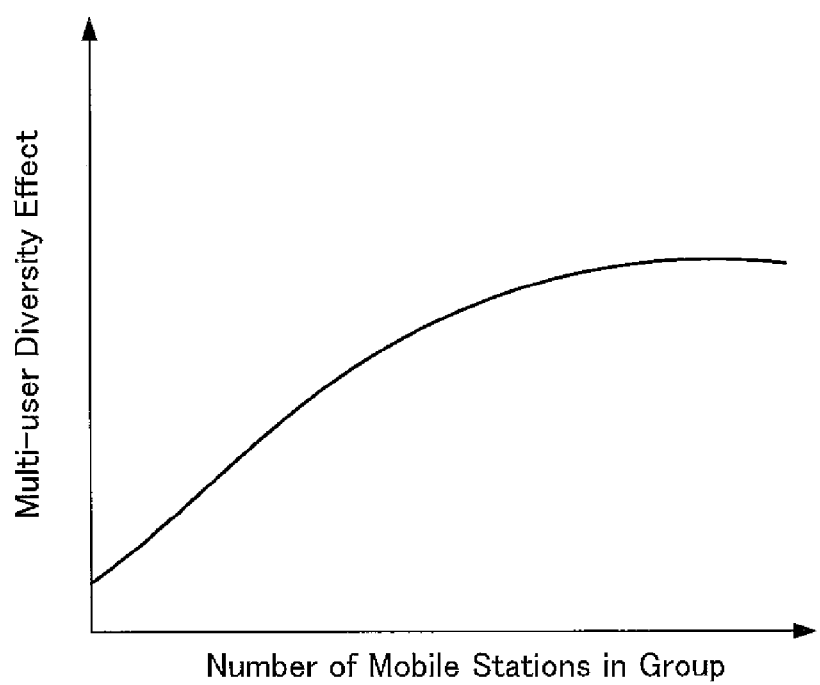
FIG. 9 is an illustration showing how multi-user diversity effect changes with the number of mobile stations per group.

FIG. 9 illustrates how multi-user diversity effect changes with the number of mobile stations 40 per group. The characteristics indicate that as the number of mobile stations per group increases, multi-user diversity effect improves, increasing system throughput. If the number of groups p is reduced without changing the number of mobile stations 40 being handled by the base station 30 (number of mobile stations 40 communicating with the base station 30), the number of mobile stations per group increases. Therefore, decreasing the number of groups p improves multi-user diversity effect, thereby increasing system throughput.

Accordingly, if the base station 30 is handling a small number of mobile stations 40, for example, if the base station 30 is handling fewer mobile stations 40 than a threshold, the grouping scheme determining section 21 may switch between 2-step grouping schemes in such a manner as to decrease the number of groups and increase the number of mobile stations 40 per group. In addition, if the number of mobile stations 40 per group grows in excess of a certain value, increasing the number of mobile stations 40 per group does not improve multi-user diversity effect as much. Therefore, if the number of mobile stations 40 per group grows in excess of a threshold (the certain value), the grouping scheme determining section 21 may switch between 2-step grouping schemes in such a manner as to increase the number of groups and increase the number of mobile stations 40 per group.

The communications system in accordance with the present embodiment allows for scheduling whereby multiple channels are allocated to single mobile stations 40 so that a base station 30 handling many mobile stations 40 with very low transfer rates can achieve frequency diversity effect. In such scheduling, the grouping scheme determining section 21 may switch between 2-step grouping schemes in such a manner as to decrease the number of groups in order to have the mobile stations 40 report an SIR for more channels to the base station 30.

The foregoing description was made based on an assumption that adjacent channels form a subgroup and adjacent subgroups form a group.

The SIRs for adjacent channels are likely to be highly related. Classifying adjacent channels into subgroups therefore reduces the variations (dispersion) of the SIR among channels in the subgroup, advantageously improving the precision of the reported SIR values. However, adjacent channels are not necessarily classified into subgroups.

Classifying adjacent subgroups into groups has no advantages. Adjacent subgroups are not necessarily classified into groups.

FIG. 10(a) shows an exemplary 2-step grouping scheme in which non-adjacent subgroups form a group. Each group contains four subgroups. FIG. 10(b) shows another exemplary 2-step grouping scheme in which non-adjacent channels form a subgroup. The grouping scheme determining section 21 may select from these 2-step grouping schemes as well as from other schemes. In the grouping schemes shown in FIGS. 10(a) and 10(b), groups of channels are allocated to the mobile stations 40 in the same manner as in FIG. 5.

Embodiment 3

The following will describe a further embodiment of the present invention in reference to FIG. 11. Here, for convenience in description, members of the present embodiment that have the same arrangement and function as members of embodiment 2 and that are mentioned in that embodiment are indicated by the same reference numerals and description thereof is omitted.

The description in embodiments 1 and 2 was made assuming that each group contained the same number of subgroups (three or four subgroups). In the present embodiment, each group contains a different number of subgroups.

The OFDMA system in accordance with the present embodiment has substantially the same configuration as the OFDMA system 200 of embodiment 2. The grouping scheme determining section 21 of embodiment 2 switched between 2-step grouping schemes in each of which the number of channels per subgroup differs, according to the dispersion of CQI levels in each subgroup and other factors. Meanwhile, the grouping scheme determining section 21 of the present embodiment is adapted to determine to which group each mobile station 20 should belong, by an invariable criterion, such as the capability of the individual mobile stations 20.

FIG. 11 shows an exemplary 2-step grouping scheme of the present embodiment. Group 1, group 2, and group 3 contain one subgroup (subgroup 1), two subgroups (subgroups 2 and 3), and eight subgroups (subgroups 4 to 11) respectively. In the grouping scheme shown in FIG. 11, groups of channels are allocated to the mobile stations 40 in the same manner as in FIG. 5.

In the 2-step grouping scheme of the present embodiment, the base station 30 changes the number of subgroups per group to which the mobile stations 40 belong according to the condition, capability, etc. of the individual mobile stations 40. Accordingly, the amount of information transmitted in an uplink from each mobile station 40 to the base station 30 is controllable to a suitable value to the mobile station 40.

For example, in the 2-step grouping scheme shown in FIG. 11, those mobile stations 40 for which the overhead caused by uplink feedback information should be restricted are arranged to belong to group 1 which contains fewer subgroups. Those mobile stations 40 for which the overhead caused by uplink feedback information does not necessarily restricted (those for which the amount of uplink feedback information is allowed to increase) are arranged to belong to group 2 or 3 which contains more subgroups.

Another example in the 2-step grouping scheme shown in FIG. 11 is to arrange those mobile stations 40 which have relatively small variations in SIR between channels to belong to group 1 which contains fewer subgroups and arrange those mobile stations 40 which have a relatively small correlation of SIR between channels to belong to group 2 or 3 which contains more subgroups.

These groupings (ways of arranging the mobile stations 40 to belong to groups) enable allocation in accordance with the condition, capability, etc. of the mobile stations 40 and reporting of high precision CQIs from the mobile stations 40 to the base station 30.

It is the base station 30 that arranges the mobile stations 40 to belong to groups as is the case in embodiment 2. In other words, the base station 30 obtains information as to whether or not to restrict the overhead caused by feedback information and arranges the mobile stations 40 to belong to the groups according to the information.

The base station 30 obtains the information as to whether or not to restrict the overhead caused by feedback information, for example, by the following methods.

(1) The communications system in accordance with the present embodiment is applicable to communications systems in which the mobile stations are classified into some categories by their capability (e.g., available bandwidth). In such a communications system, specifically, the mobile stations (terminals) are classified into categories and record the respective categories in advance in the manufacturing process. Each mobile station notifies the base station 30 of its category in a call setup request. Therefore, if the communications system in accordance with the present embodiment is applied to the communications system, the base station 30 can determine, in reference to the category, for which mobile stations 40 the overhead caused by feedback information should be restricted. For example, the base station 30 can determine those mobile stations 40 in a category with a relatively narrow available bandwidth as the mobile stations 40 for which the overhead caused by feedback information should be restricted.

(2) The base station also performs uplink scheduling in a typical cellular system. In other words, in a typical cellular system, it is the base station that determines the amount of data which a mobile station is allowed to transmit in an uplink. Therefore, applying the communications system in accordance with the present embodiment to a typical cellular system and supposing that the amount of uplink control information is variable in the system, the base station 30 knows maximum uplink transfer volumes for all of the mobile stations 40. According to information on the maximum uplink transfer volumes for the mobile stations 40, the base station 30 may determine for which mobile stations 40 the overhead caused by feedback information should be restricted.

(3) A method may be conceived by which the mobile station 40 delivers information that it wants to restrict overhead to the base station 30. For example, if the mobile station 40 wants to reduce power consumption (for example, when the mobile station 40 operates on a battery with low remaining power), the mobile station 40 may deliver information that it wants to restrict overhead to the base station 30 to reduce the power consumption required to send feedback information.

In the foregoing description, the grouping scheme determining section 21 of the present embodiment is adapted to determine to which group each mobile station 40 should belong, by an invariable criterion, such as the capability of the individual mobile stations 40. The grouping scheme determining section 21 of the present embodiment, however, may determine to which group each mobile station 40 should belong, by a time-varying criterion, such as the condition of the individual mobile station 40. In other words, the grouping scheme determining section 21 of the present embodiment may be configured to switch between 2-step grouping schemes in which the mobile stations 40 are arranged to belong differently to groups, by a time-varying criterion, such as the condition of the individual mobile stations 40. In that case, the number of subgroups in the groups to which each mobile station 40 belongs can be varied according to a time-varying criterion, such as the condition of the individual mobile stations 40. That makes it possible to adaptively change the amount of information which is sent from the mobile stations 40 to the base station 30 in an uplink. In addition, the section 21 may switch between 2-step grouping schemes each of which contain either the same or different numbers of groups/subgroups.

In the foregoing description, it was the base station 30 that allocated groups to the mobile stations 40. This is not the only possibility. In sending a call setup request or periodically, the base station 30 may notify the mobile stations 40 of a 2-step grouping scheme, and the mobile stations 40 may request to which group they should belong. Alternatively, irregularly, for example, when the system throughput have dropped or the number of mobile stations 40 being handled by the base station 30 has changed, the base station 30 may notify the mobile stations 40 of a 2-step grouping scheme, and the mobile stations 40 may request to which group they should be belong.

The base station 30 obtains information on the correlation of SIR between channels by the same method as the method described in embodiment 2 (the grouping scheme determining section 21 obtains information on the dispersion of CQI levels in each subgroup).

Embodiment 4

The following will describe yet another embodiment of the present invention in reference to FIGS. 12(a) and 12(b). Here, for convenience in description, members of the present embodiment that have the same arrangement and function as members of embodiment 2 and that are mentioned in that embodiment are indicated by the same reference numerals and description thereof is omitted.

The present embodiment will describe an exemplary grouping in consideration of the QoS (Quality of Service) of the data transmitted to mobile stations.

For the sake of simplicity, the present embodiment assumes two data QoS attributes: high priority and low priority.

The OFDMA system in accordance with the present embodiment has substantially the same configuration as the OFDMA system 200 of embodiment 1. In embodiment 2, the grouping scheme determining section 21 switched between 2-step grouping schemes in which the number of channels per subgroup is changed according to the dispersion of CQI levels and other factors in the subgroup. The grouping scheme determining section 21 of the present embodiment is adapted to determine to which group each mobile station 40 should belong, by the priority of data to be transmitted to the mobile station 40.

In other words, in the OFDMA system of the present embodiment, the mobile station 40 transmits, along with a data transmission request, information representing the priority of the data for which the mobile station 40 is transmitting the request, to the base station 30. The grouping scheme determining section 21 in the base station 30 determines to which group each mobile station 40 should be belong, according to the information representing the priority.

FIGS. 12(a) and 12(b) show exemplary allocation of groups of channels to the mobile stations 40 in the present embodiment. In these examples, the base station 30 communicates with six mobile stations UE1 to UE6. Of the mobile stations UE1 to UE6. The three mobile stations UE1 to UE3 request high priority data, whilst the other three mobile stations UE4 to UE6 request low priority data. Channels are arranged into subgroups in the grouping schemes shown in FIG. 12 in the same manner as in FIG. 6 (FIG. 4).

FIG. 12(a) shows the same number of groups being allocated to the mobile stations UE1 to UE3 requesting high priority data and the mobile stations UE4 to UE6 requesting low priority data. The allocation prevents high priority mobile stations from belonging only to particular groups and thus reduces the chances of the mobile stations which are handling high priority transmission data running out of resources. In the example in FIG. 12(a), the same number of groups are allocated to the mobile stations UE1 to UE3 requesting high priority data and the mobile stations UE4 to UE6 requesting low priority data. The grouping, as a result, is the same as in embodiment 1.

FIG. 12(b) shows more groups being allocated to the mobile stations UE4 to UE6 requesting low priority data than to the mobile stations UE1 to UE3 requesting high priority data. This allocation enables more (four) channels (more resources) to be allocated to the mobile stations UE1 to UE3 requesting high priority data than to the mobile stations UE4 to UE6 requesting low priority data (to which two channels are allocated). Therefore, the high priority data can be transmitted faster and more reliably to the mobile stations UE1 to UE3.

Embodiment 5

Figure 13:
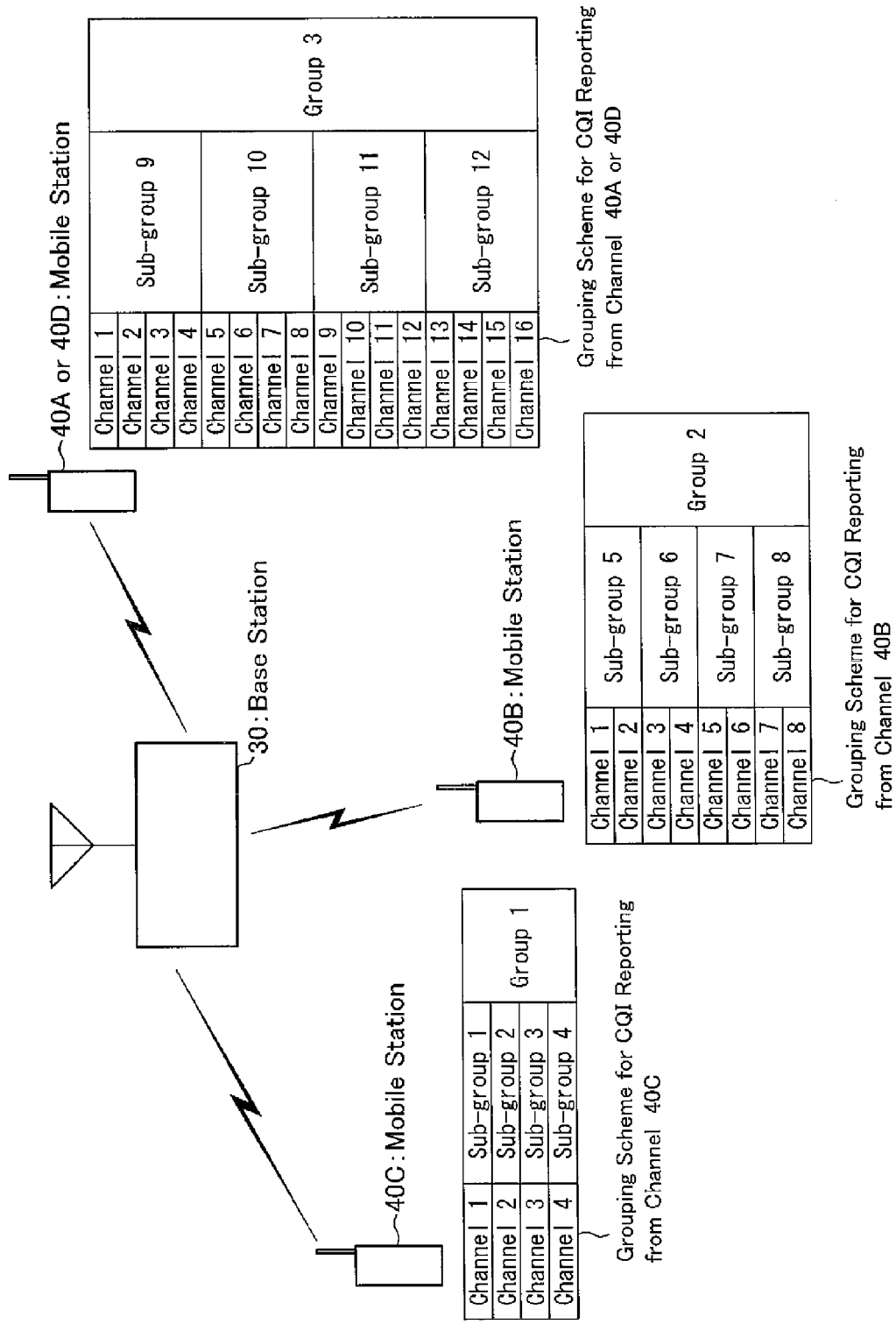
FIG. 13 is an illustration showing an example of an OFDMA system which employs different 2-step grouping schemes for different mobile stations.

The following will describe still another embodiment of the present invention in reference to FIG. 13. Here, for convenience in description, members of the present embodiment that have the same arrangement and function as members of embodiment 2 and that are mentioned in that embodiment are indicated by the same reference numerals and description thereof is omitted.

The embodiments above described communications systems which employed the same 2-step grouping scheme to all mobile stations. The present embodiment will describe a communications system which employs a different 2-step grouping scheme for each mobile station reporting the CQI to the base station.

The OFDMA system in accordance with the present embodiment has substantially the same configuration as the OFDMA system 200 of embodiment 1. The grouping scheme determining section 21 in embodiment 2 switched between multiple 2-step grouping schemes among which the number of channels in each subgroup may differ according to, for example, the dispersion of CQI levels in the subgroup. In the present embodiment, the grouping scheme determining section 21 in the base station 30 however is adapted to determine a 2-step grouping scheme for use by each mobile station 40 to communicate the CQI, according to the coherent bandwidth of the transmission path from the base station 30 to that mobile station 40.

In the OFDMA system in accordance with the present embodiment, it is assumed that, for example, the grouping scheme determining section 21 in the base station 30 selects one 2-step grouping scheme from the three 2-step grouping schemes shown in FIG. 7 for each mobile station 40 so that the mobile station 40 can notify the base station 30 of the CQI (SIR) by the selected 2-step grouping scheme.

It is also assumed that, for example, the mobile stations 40 in communication with the base station 30 includes: a mobile station 40A the transmission path from the base station 30 to which mobile station 40A has four or more times as broad a coherent bandwidth as the channel bandwidth, a mobile station 40B the transmission path from the base station 30 to which mobile station 40B has about twice as broad a coherent bandwidth as the channel bandwidth, a mobile station 40C the transmission path from the base station 30 to which mobile station 40C has about as broad a coherent bandwidth as the channel bandwidth, and a mobile station 40D the transmission path from the base station 30 to which mobile station 40D does not have as broad a coherent bandwidth as the channel bandwidth.

The SIR varies by smaller amounts between the channels in the same subgroup for a mobile station 40 the transmission path from the base station 30 to which mobile station 40 has a broader coherent bandwidth. Accordingly, as a principle, the number of channels per subgroup is increased for a mobile station 40 the transmission path from the base station 30 to which mobile station 40 has a relatively broad coherent bandwidth. Note that the number of channels per subgroup is maximized for the mobile station 40D the transmission path from the base station 30 to which mobile station 40D has a coherent bandwidth not as broad as the channel bandwidth.

In other words, the SIR varies only by small amounts between the channels in the same subgroup the mobile station 40A the transmission path from the base station 30 to which mobile station 40A has the broadest coherent bandwidth even if four channels are arranged to form a subgroup. Accordingly, the 2-step grouping scheme shown in FIG. 7(c) is selected for use by the mobile station 40A to report the CQI because the scheme can report SIR information on more channels without increasing the amount of CQI information.

The 2-step grouping scheme shown in FIG. 7(b) is selected for use by the mobile station 40B to report the CQI because the scheme can report SIR information on more channels while restricting SIR variations between the channels in each subgroup.

If the 2-step grouping scheme shown in FIGS. 7(b) and 7(c) is applied to the mobile station 40C, the SIR varies greatly between the channels in the same subgroup. Accordingly, the 2-step grouping scheme shown in FIG. 7(a) is selected for use by the mobile station 40C to report the CQI.

Whichever 2-step grouping scheme is selected for the mobile station 40D, the SIR varies equally greatly between the channels in the same subgroup. Accordingly, the SIR variations between the channels in the same subgroup are not considered; the 2-step grouping scheme shown in FIG. 7(c) is selected for use by the mobile station 40D to report the CQI because the scheme can report SIR information on more channels without increasing the amount of CQI information.

As described in the foregoing, the OFDMA system in accordance with the present embodiment employs a different 2-step grouping scheme for each mobile station 40 as illustrated in FIG. 13.

The scheduler section 22 in the base station 30 selects, for each channel, a mobile station 40 to which the channel will be allocated, from the mobile stations 40 which have reported the SIR for the channel.

In this example, a 2-step grouping scheme which differs from the other 2-step grouping schemes in the number of channels per subgroup is selected for each mobile station 40, by considering an SIR report precision improving effect in which the number of channels per subgroup is reduced to reduce the dispersion of the SIR for the subgroup and an SIR report efficiency improving effect in which the number of channels per subgroup is increased to report the SIRs for more channels without increasing the amount of CQI information. That achieves both good improvement in the precision of CQI reports and good improvement in the efficiency of CQI reports.

As discussed so far, an optimal 2-step grouping scheme can be selected for each mobile station 40 by each mobile station 40 using a different 2-step grouping scheme in reporting the CQI to the base station 30. Therefore, the efficiency of CQI reports can be improved while retaining the precision of the CQI reports.

Embodiment 6

Figure 14:
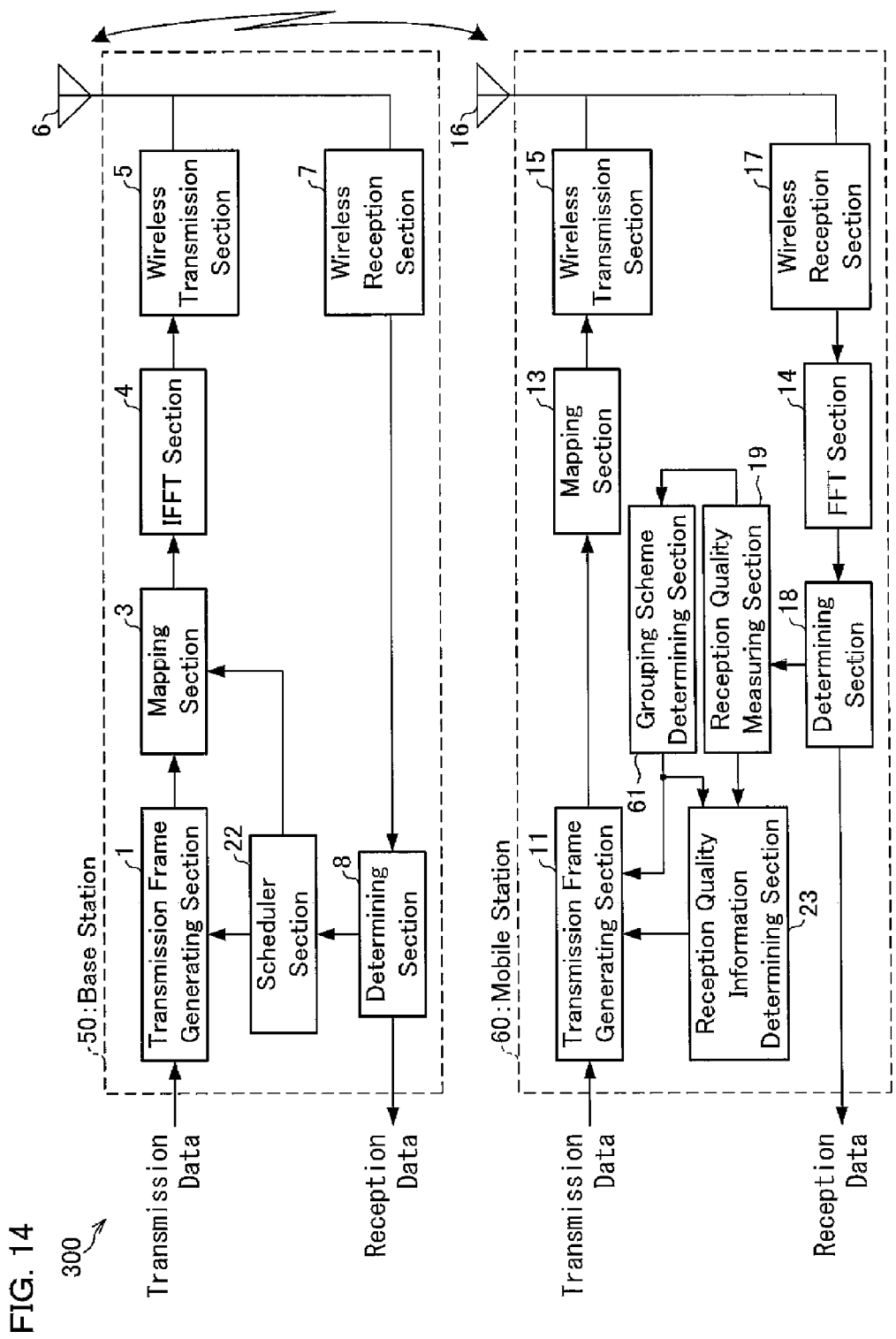
FIG. 14 is a block diagram showing the structure of an OFDMA system as a communications system in accordance with a further embodiment of the present invention.

The following will describe another embodiment of the present invention in reference to FIG. 14. Here, for convenience in description, members of the present embodiment that have the same arrangement and function as members of any one of embodiments 1 to 5 and that are mentioned in that embodiment are indicated by the same reference numerals and description thereof is omitted.

The present embodiment will describe mobile stations determining a 2-step grouping scheme.

In the communications system of embodiment 5, the base station 30 does not necessarily determine a 2-step grouping scheme for each mobile station 40 according to the CQI reported by the mobile stations 40; instead, each mobile station may determine a 2-step grouping scheme.

FIG. 14 is a block diagram, as an example, of an OFDMA system in accordance with the present embodiment in which the individual mobile stations determines a 2-step grouping scheme.

As illustrated in FIG. 14, the OFDMA system 300 in accordance with the present embodiment includes a base station 50 and a mobile station (terminal) 60, the base station 50 communicating with the mobile station 60 over a plurality of channels. Although FIG. 14 shows only one base station 50 and only one mobile station 60, the OFDMA system in accordance with the present embodiment includes multiple mobile stations 60 only one of which is shown in FIG. 14.

The mobile station 60 has the same configuration as the mobile station 40 of embodiment 5 except that the mobile station 60 contains a grouping scheme determining section (grouping scheme selecting section) 61. The grouping scheme determining section 61 in the mobile station 60 determines a 2-step grouping scheme according to the SIR measured by the reception quality measuring section 19. The section 61 may determine a 2-step grouping scheme by the same method as in embodiment 5. The reception quality information determining section 23 is informed of the 2-step grouping scheme determined by the grouping scheme determining section 61. The reception quality information determining section 23 groups the SIR measured by the reception quality measuring section 19 by 2 steps according to the acquired 2-step grouping scheme to generates a CQI (reception quality information). The transmission frame generating section 11 generates a control signal by which a 2-step grouping scheme is reported to the base station 50, and multiplexes the control signal into transmission frames. The control signal may be generated and multiplexed either periodically or when a switching is made between 2-step grouping schemes.

The base station 50 has the same configuration as the base station 30 of embodiment 5 except that the base station 50 contains a grouping scheme determining section 21. In the base station 30, the determining section 8 sends a 2-step grouping scheme along with a CQI to the scheduler section 22. The scheduler section 22 performs scheduling for each channel according to the CQI and the 2-step grouping scheme.

In the description so far, each mobile station belonged to one group. Some of the mobile stations may belong to multiple groups. Alternatively, all the mobile stations may belong to multiple groups (not all the some groups).

In the description so far, the communications system did not include a mobile station which reported the CQI for all the channels to the base station. The communications system in accordance with the present invention may contain a mobile station which reports the CQIs for all the channels to the base station. For example, the mobile stations requesting high priority data may report the CQIs for all the channels to the base station, and the mobile stations requesting low priority data may report only the CQIs for some, not all, of the channels. This method also delivers a desired effect of restricting the amount of CQI information reported by the mobile stations to the base station.

When multiple 2-step grouping schemes are switchably used, one of the selectable 2-step grouping schemes may designate each channel as a different subgroup and arrange all subgroups into a single group, and the other selectable 2-step grouping scheme may designate at least one mobile station (which is capable of restricting the amount of CQI information it reports to the base station) to report only the CQIs for the subgroups in one or some of the groups to which the mobile station belongs to the base station. For example, 2-step grouping schemes may switchably be used according to how much the user wants to restrict the amount of feedback information: if the amount of feedback information does not need to be restricted, a 2-step grouping scheme may be selected which designates each channel as a different subgroup and arranges all subgroups into a single group.

The present invention is not limited to the OFDMA mobile wireless communications system containing a base station and multiple mobile stations, but applicable to general communications systems in which a base station and multiple terminals transmits/receives data over a plurality of channels of different communications capacities. In other words, the embodiments above described applications of the present invention to communications systems in which the channels were frequency channels (channels distinguished by frequency). However, the present invention is also applicable to communications systems, like a MIMO (Multiple Input Multiple Output) communications system (not necessarily a multicarrier), in which the channels are a plurality of space channels of different communications capacities (channels distinguished by space, like the position of an antenna and the direction of transmission beam). The present invention is also applicable to combinations of these communications systems in which the channels are a plurality of space-frequency channels. Furthermore, in a communications system involving spreading, the present invention is applicable if the channels are distinguishable by code spreading. The present invention is applicable to both wired and wireless systems.

A communications system of the present invention, as described in the foregoing, includes a base station and a plurality of terminals, the base station communicating with the terminals over a plurality of channels, the terminals each reporting reception quality information to the base station, the base station scheduling communications over the channels according to the reception quality information reported by the terminals, the terminals each including: a reception quality measuring section for measuring reception quality; and a reception quality information determining section for generating, for reporting to the base station, reception quality information for each subgroup according to 2-step grouping scheme information by which at least one channel forms a subgroup and at least one subgroup forms a group and also according to the reception quality measured by the reception quality measuring section, wherein: each group is allocated to at least one of the terminals according to the 2-step grouping scheme information; and the reception quality information determining section in at least one of the terminals generates, for reporting, the reception quality information only for each subgroup that belongs to the group(s) allocated to that terminal by, at least under some conditions, using 2-step grouping scheme information by which some of all the groups are allocated to the terminal.

According to the first method of non-patent documents 1 and 2, the mobile stations report reception quality information for all channels to the base station. In contrast, in the configuration, at least one of the terminals generates, for reporting, reception quality information only for each subgroup that belongs to the group(s) allocated to that terminal at least under some conditions.

In the configuration, unlike the method of patent document 1, the size of blocks does not need to be controlled according to the reception power of incoming subcarriers. In addition, again unlike the method of patent document 1, the terminals do not need to notify the base station of a subcarrier number at a particular position.

According to the second method of non-patent document 2, only simple grouping is carried out. In contrast, in the configuration, a 2-step grouping is carried out that is a combination of the first grouping (subgrouping) and the second grouping (grouping).

The configuration hence can reduce the amount of the reception quality information reported by the terminals to the base station when compared with non-patent documents 1 and 2 and patent document 1. As a result, uplink overhead is lowered, and throughput is improved.

The communications system of the present invention, in a preferred example, adaptively controls the number of subcarriers per subgroup and the number of subgroups per group, as described in the foregoing, based on parameters such as the transmission path, the number of users, and the error ratio.

The adaptive control prevents the precision of the reception quality information from decreasing and optimizes the scheduling that is carried out based on the reception quality information. In other words, the configuration further reduce the amount of the reception quality information reported by the terminals to the base station, while optimizing the scheduling, hence improves throughput.

The communications system of the present invention, in the communications system configured as above, may be adopted so that the base station includes: a first grouping scheme selecting section for selecting a set of 2-step grouping scheme information for use by the reception quality information determining section from plural sets of 2-step grouping scheme information; and a transmission section for transmitting the set of 2-step grouping scheme information selected by the first grouping scheme selecting section to the terminals and that the terminals each includes a reception section for receiving for receiving the 2-step grouping scheme information transmitted from the transmission section.

In the configuration, the base station can collectively, hence efficiently, select a 2-step grouping scheme for the terminals.

The communications system of the present invention, in the communications system configured as above, may be adopted so that the first grouping scheme selecting section selects a set of 2-step grouping scheme information for use by the reception quality information determining section from plural sets of 2-step grouping scheme information which designate different numbers of channels per subgroup, according to dispersion of reception quality at each terminal among the channels in each subgroup.

In the configuration, the first grouping scheme selecting section selects a set of 2-step grouping scheme information for use by the reception quality information determining section from plural sets of 2-step grouping scheme information which designate different numbers of channels per subgroup, according to dispersion of reception quality at each terminal among the channels in each subgroup. Accordingly, if the dispersion of reception quality at the terminal among the channels in each subgroup increases, the dispersion of reception quality at the terminal can be lowered by reducing the number of channels per subgroup. That prevents the precision of the reception quality information from decreasing, thereby optimizing the scheduling that is carried out based on the reception quality information. In other words, the configuration can reduce the amount of the reception quality information reported by the terminals to the base station, while optimizing the scheduling.

The communications system of the present invention, in the communications system configured as above, may be adopted so that the terminals each further includes a second grouping scheme selecting section for selecting a set of 2-step grouping scheme information for use by the reception quality information determining section from plural sets of 2-step grouping scheme information.

In the configuration, each terminal selects 2-step grouping scheme information. Therefore, the base station does not need to transmit 2-step grouping scheme information to the terminals.

The communications system of the present invention, in the communications system configured as above, may be adopted so that the second grouping scheme selecting section selects a set of 2-step grouping scheme information for use by the reception quality information determining section from plural sets of 2-step grouping scheme information which designate different numbers of channels per subgroup, according to the dispersion of reception quality measured by the reception quality measuring section among the channels in each subgroup.

In the configuration, the second grouping scheme selecting section selects a set of 2-step grouping scheme information for use by the reception quality information determining section from plural sets of 2-step grouping scheme information which designate different numbers of channels per subgroup, according to the dispersion of reception quality at the terminal among the channels in each subgroup. Accordingly, if the dispersion of reception quality at the terminal among the channels in each subgroup increases, the dispersion of reception quality at the terminal can be lowered by reducing the number of channels per subgroup. That prevents the precision of the reception quality information from decreasing, thereby optimizing the scheduling that is carried out based on the reception quality information. In other words, the configuration can reduce the amount of the reception quality information reported by the terminals to the base station, while optimizing the scheduling.

The communications system of the present invention, in the communications system configured as above, may be adopted so that the first or second grouping scheme selecting section selects a set of 2-step grouping scheme information for use by the reception quality information determining section from a plurality of 2-step grouping schemes which designate different numbers of groups and which designate equal numbers of subgroups per group.

In the configuration, switching between grouping schemes does not change the number of subgroups per group. The configuration thus makes constant the amount of the reception quality information reported by the terminals to the base station. The configuration can hence reduce the amount of the reception quality information reported by the terminals to the base station to a particular value or even further. This is especially effective in mobile phone systems to which the present invention may be applied because the systems allow for limited amounts of control information.

Furthermore, in the configuration, when the terminals transmit information on a grouping scheme to the base station so that the base station can recognize the number of groups and the number of channels per subgroup from the transmitted information, the terminals can restrict the amount of the information on a grouping scheme transmitted to the base station. In other words, when the number of subcarriers per group is changeable, to enable the base station to recognize the number of groups and the number of channels per subgroup, the terminals need to send, to the base station, information by which to recognize the number of groups and information by which to recognize the number of channels per subgroup. In contrast, the configuration fixes the number of subcarriers per group. Therefore, once the terminals send, to the base station, only information by which to recognize the number of groups, the base station can recognize both the number of groups and the number of channels per subgroup.

Furthermore, the configuration fixes the number of subcarriers per group. Therefore, the amount of the reception quality information for each group is constant.

In addition, in the configuration, once the number of groups is determined, the number of channels per subgroup is automatically determined. Therefore, the number of channels per subgroup can be changed by switching between 2-step grouping schemes which designate different numbers of groups. Accordingly, the number of channels per subgroup can be reduced, and the dispersion of reception quality at the terminal among the channels in each subgroup can be lowered, by switching between 2-step grouping schemes which designate different numbers of groups. That prevents the precision of the reception quality information from decreasing, thereby optimizing the scheduling that is carried out based on the reception quality information. In other words, the configuration can reduce the amount of the reception quality information reported by the terminals to the base station, while optimizing the scheduling.

The communications system of the present invention, in the communications system configured as above, may be adopted so that the first or second grouping scheme selecting section selects a set of 2-step grouping scheme information for use by the reception quality information determining section from a plurality of 2-step grouping schemes in which each group is allocated to different numbers of terminals, according to the number of terminals in communications with the base station.

In the configuration, when there are a relatively few terminals in communications with the base station, the first or second grouping scheme selecting section can select a 2-step grouping scheme so that the groups contain more mobile stations. Accordingly, the multi-user diversity effect is improved, and so is the system throughput.

The communications system of the present invention, in the communications system configured as above, may be adopted so that the first or second grouping scheme selecting section selects a set of 2-step grouping scheme information for use by the reception quality information determining section so as to allocate to each terminal a number of groups which is determined depending on priority of data which will be transmitted from the base station to the terminals.

In the configuration, the first or second grouping scheme selecting section can allocate more channels to terminals requesting high priority data than to terminals requesting low priority data. Therefore, the base station can transmit the high priority data faster and more reliably to the terminals.

The communications system of the present invention, in the communications system configured as above, may be adopted so that the first or second grouping scheme selecting section selects a set of 2-step grouping scheme information for use by the reception quality information determining section for each terminal.

In the configuration, the first or second grouping scheme selecting section can optimize the 2-step grouping scheme information for each terminal, thereby further reducing the amount of the reception quality information reported by the terminals to the base station.

The communications system of the present invention, in the communications system configured as above, may be adopted so that the 2-step grouping scheme information is modified so that adjacent channels form at least one of the subgroups by the 2-step grouping scheme information.

Reception quality is likely to have high correlation between adjacent channels. Therefore, the dispersion of reception quality among the channels in each subgroup is reduced, and the precision of the reception quality information is improved, by arranging adjacent channels into a subgroup as in the configuration. The configuration thus optimizes the scheduling that is carried out based on the reception quality information.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention is applicable to construction of OFDMA mobile wireless communications systems, MIMO communications systems, and like communications systems which involve a relatively small amount of uplink control information.

The invention claimed is:

1. A communications system, including a base station and a plurality of terminals, the base station communicating wirelessly with the terminals over a plurality of channels, the terminals each reporting reception quality information for a reception signal to the base station, the base station scheduling communications over the channels according to the reception quality information reported by the terminals, the terminals each comprising:

a reception quality measuring section for measuring reception quality of reception signals for the channels; and a reception quality information determining section for generating, for reporting to the base station, representative reception quality information for each subgroup (i) by a 2-step grouping scheme by which the channels are divided into subgroups and the subgroups are divided into groups and (ii) according to the reception quality measured by the reception quality measuring section, wherein:

the groups are allocated to the terminals by the 2-step grouping scheme; and the reception quality information determining section in each terminal generates, for reporting, the representative reception quality information only for each subgroup that belongs to the group(s) allocated to that terminal.

2. The communications system of claim 1, wherein:

the base station comprises:

a grouping scheme selecting section for selecting a 2-step grouping scheme for use by the reception quality information determining section from a plurality of 2-step grouping schemes; and a transmission section for transmitting information on the 2-step grouping scheme selected by the grouping scheme selecting section to the terminals, and the terminals each comprises:

a reception section for receiving the information on the 2-step grouping scheme transmitted from the transmission section.

3. The communications system of claim 2, wherein the grouping scheme selecting section selects a 2-step grouping scheme for use by the reception quality information determining section from a plurality of 2-step grouping schemes which designate different numbers of groups and which designate equal numbers of subgroups per group.

4. The communications system of claim 2, wherein the grouping scheme selecting section selects a 2-step grouping scheme for use by the reception quality information determining section from a plurality of 2-step grouping schemes which designate different numbers of channels per subgroup according to dispersion of reception quality at the terminal among the channels in each subgroup.

5. The communications system of claim 2, wherein the grouping scheme selecting section selects a 2-step grouping scheme for use by the reception quality information determining section from a plurality of 2-step grouping schemes which designate different numbers of terminals to which the individual groups are allocated, according to the number of terminals in communications with the base station.

6. The communications system of claim 2, wherein the grouping scheme selecting section selects a 2-step grouping scheme for use by the reception quality information determining section so as to allocate to each terminal a number of groups which is determined depending on priority of data which will be transmitted from the base station to the terminals.

7. The communications system of claim 2, wherein the grouping scheme selecting section selects a 2-step grouping scheme for use by the reception quality information determining section for each terminal.

8. The communications system of claim 2, wherein the 2-step grouping scheme is modified so that adjacent channels form at least one of the subgroups by the 2-step grouping scheme.

9. The communications system of claim 1, wherein:
the terminals each comprises:
a grouping scheme selecting section for selecting a 2-step grouping scheme for use by the reception quality information determining section from a plurality of 2-step grouping schemes; and
a transmission section for transmitting information on the 2-step grouping scheme selected by the grouping scheme selecting section to the base station, and
the base station comprises:
a reception section for receiving the information on the 2-step grouping scheme transmitted from the transmission section.

10. The communications system of claim 9, wherein the grouping scheme selecting section selects a 2-step grouping scheme for use by the reception quality information determining section from a plurality of 2-step grouping schemes which designate different numbers of groups and which designate equal numbers of subgroups per group.

11. The communications system of claim 9, wherein the grouping scheme selecting section selects a 2-step grouping scheme for use by the reception quality information determining section from a plurality of 2-step grouping schemes which designate different numbers of channels per subgroup according to dispersion of reception quality at the terminal among the channels in each subgroup.

12. The communications system of claim 9, wherein the grouping scheme selecting section selects a 2-step grouping scheme for use by the reception quality information determining section from a plurality of 2-step grouping schemes which designate different numbers of terminals to which the individual groups are allocated, according to the number of terminals in communications with the base station.

13. The communications system of claim 9, wherein the grouping scheme selecting section selects a 2-step grouping scheme for use by the reception quality information determining section so as to allocate to each terminal a number of groups which is determined depending on priority of data which will be transmitted from the base station to the terminals.

14. The communications system of claim 9, wherein the grouping scheme selecting section selects a 2-step grouping scheme for use by the reception quality information determining section for each terminal.

15. The communications system of claim 9, wherein the 2-step grouping scheme is modified so that adjacent channels form at least one of the subgroups by the 2-step grouping scheme.

16. A base station for use in a communications system including the base station and a plurality of terminals, the base station communicating wirelessly with the terminals over a plurality of channels,
the base station comprising:
a grouping scheme selecting section for selecting a 2-step grouping scheme by which the channels are divided into subgroups and the subgroups are divided into groups from a plurality of 2-step grouping schemes;
a transmission section for transmitting information on the 2-step grouping scheme selected by the grouping scheme selecting section to the terminals; and
a reception section for receiving, from each terminal, reception quality information representative of reception quality for the channels only for each subgroup that belongs to the group allocated to that terminal.

17. A terminal for use in a communications system including a base station, said terminal, and one or more other terminals, the base station communicating wirelessly with the terminals over a plurality of channels,
said terminal comprising:
a reception quality measuring section for measuring reception quality; and
a reception quality information determining section for generating, for reporting to the base station, representative reception quality information for each of a plurality of subgroups (i) by a 2-step grouping scheme by which the channels are divided into the subgroups and the subgroups are divided into groups and (ii) according to the reception quality measured by the reception quality measuring section, wherein:
the groups are allocated to said terminal by the 2-step grouping scheme; and
the reception quality information determining section generates, for reporting, the representative reception quality information only for each of the subgroups that belongs to the group(s) allocated to said terminal.

* * * * *